(12) United States Patent
Yoon et al.

(10) Patent No.: US 10,191,619 B2
(45) Date of Patent: Jan. 29, 2019

(54) METHOD FOR DISPLAYING AND AN ELECTRONIC DEVICE THEREOF

(71) Applicant: Samsung Electronics Co., Ltd., Suwon-si, Gyeonggi-do (KR)

(72) Inventors: Pil-Joo Yoon, Seongnam-si (KR); Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 14/906,700

(22) PCT Filed: Aug. 6, 2014

(86) PCT No.: PCT/KR2014/007252
§ 371 (c)(1),
(2) Date: Jan. 21, 2016

(87) PCT Pub. No.: WO2015/020417
PCT Pub. Date: Feb. 12, 2015

(65) Prior Publication Data
US 2016/0162130 A1 Jun. 9, 2016

(30) Foreign Application Priority Data
Aug. 6, 2013 (KR) .................. 10-2013-0093145

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04842* (2013.01); *G06F 3/04845* (2013.01);
(Continued)

(58) Field of Classification Search
CPC ...... G06F 3/0482; G06F 3/04845; G06F 3/14; G06F 3/0487
See application file for complete search history.

(56) References Cited

U.S. PATENT DOCUMENTS 5,544,300 A * 8/1996 Skarbo .................. G06F 3/0481
715/753
5,760,772 A * 6/1998 Austin .................. G06F 3/0481
715/798
(Continued)

FOREIGN PATENT DOCUMENTS

CN 101727302 A 6/2010
KR 10-0827121 B1 5/2008
(Continued)

OTHER PUBLICATIONS

European Search Report, dated May 24, 2017, issued in the European Application No. 14834503.6.

*Primary Examiner* — William L Bashore
*Assistant Examiner* — Gregory A Distefano
(74) *Attorney, Agent, or Firm* — Jefferson IP Law, LLP

(57) ABSTRACT

Display apparatus and method of an electronic device are provided. The electronic device includes a display, and a processor. The processor fetches a display region for displaying a screen when an application is executed, and fetches and displays a plurality of screens in the fetched display region.

26 Claims, 20 Drawing Sheets

(51) Int. Cl.
    *G06F 3/14*      (2006.01)
    *G09G 5/14*      (2006.01)
    *G06F 3/0484*    (2013.01)

(52) U.S. Cl.
    CPC ............ *G06F 3/04847* (2013.01); *G06F 3/14* (2013.01); *G06F 3/1423* (2013.01); *G09G 5/14* (2013.01); *G06F 2203/04803* (2013.01); *G09G 2340/045* (2013.01)

(56) References Cited

U.S. PATENT DOCUMENTS

| | | | |
|---|---|---|---|
| 2004/0041841 A1 | 3/2004 | Lemogne et al. | |
| 2006/0020904 A1 | 1/2006 | Aaltonen et al. | |
| 2008/0082920 A1 | 4/2008 | Eom | |
| 2008/0146286 A1 | 6/2008 | Byun et al. | |
| 2008/0204424 A1 | 8/2008 | Jin et al. | |
| 2010/0235777 A1* | 9/2010 | Herz | G06F 9/4445 715/778 |
| 2010/0269047 A1* | 10/2010 | Pahlavan | G06F 9/4445 715/740 |
| 2011/0187709 A1 | 8/2011 | Lee et al. | |
| 2011/0239156 A1* | 9/2011 | Lin | G06F 3/04883 715/788 |
| 2012/0042102 A1 | 2/2012 | Chung et al. | |
| 2012/0084738 A1 | 4/2012 | Sirpal | |
| 2012/0254773 A1 | 10/2012 | Viswanathan | |
| 2013/0047119 A1 | 2/2013 | Lee | |
| 2013/0091447 A1 | 4/2013 | Kang | |
| 2016/0085382 A1* | 3/2016 | Suzuki | G06F 3/04883 715/783 |
| 2016/0357368 A1* | 12/2016 | Federighi | G06F 3/0483 |
| 2018/0129362 A1* | 5/2018 | Sirpal | G06F 1/1616 |

FOREIGN PATENT DOCUMENTS

| | | |
|---|---|---|
| KR | 10-2008-0078108 A | 8/2008 |
| KR | 10-2010-0092613 A | 8/2010 |
| KR | 10-2012-0015931 A | 2/2012 |

* cited by examiner

[Fig. 1]
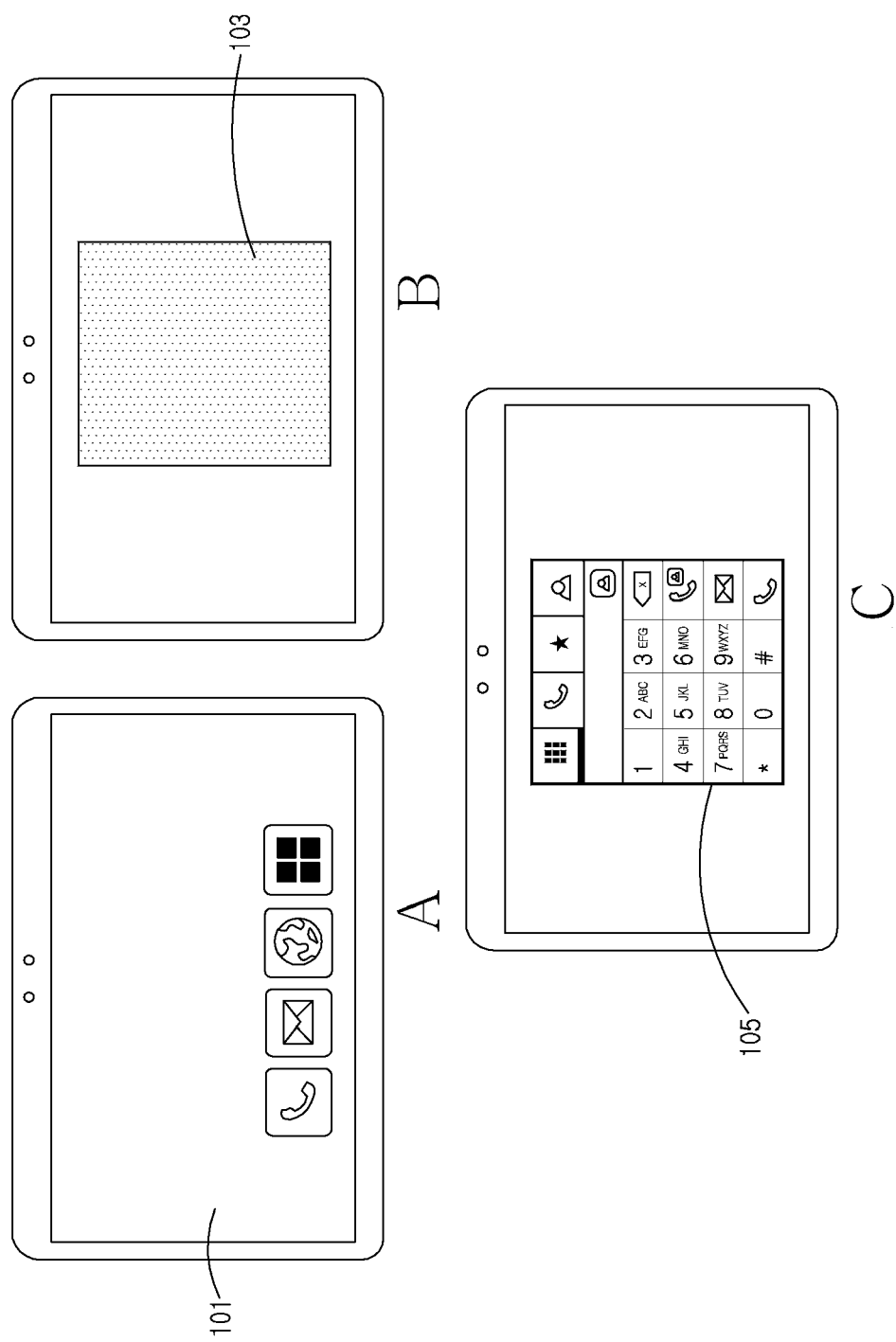

[Fig. 2]
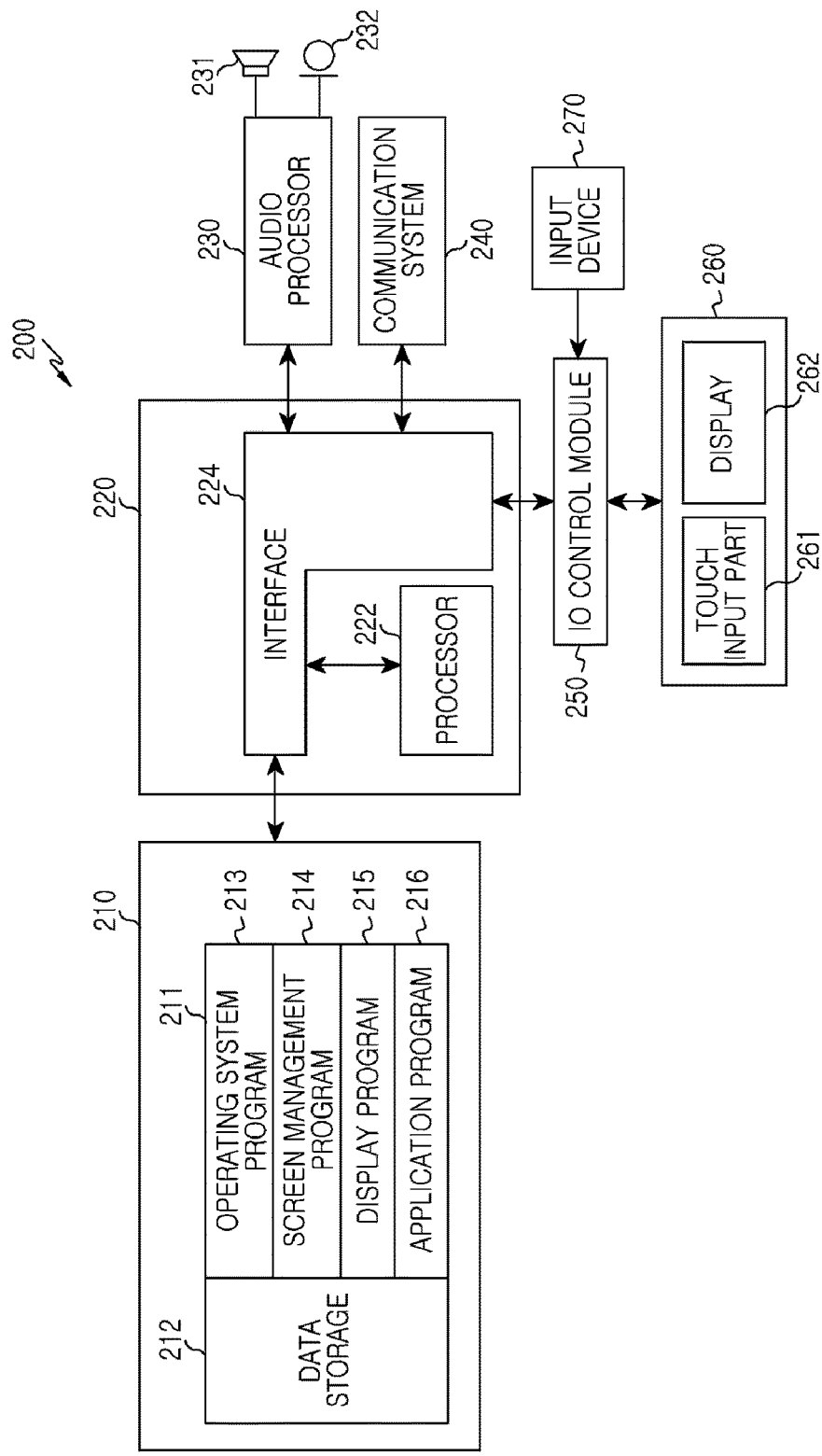

[Fig. 3]
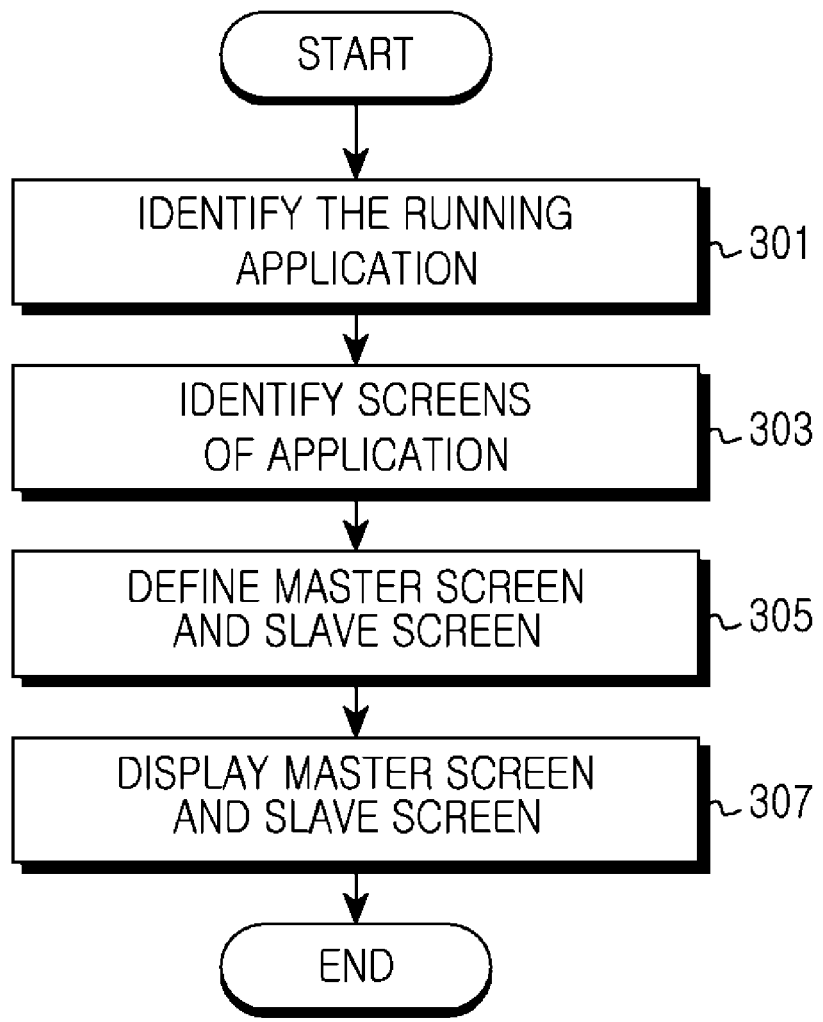

[Fig. 4]
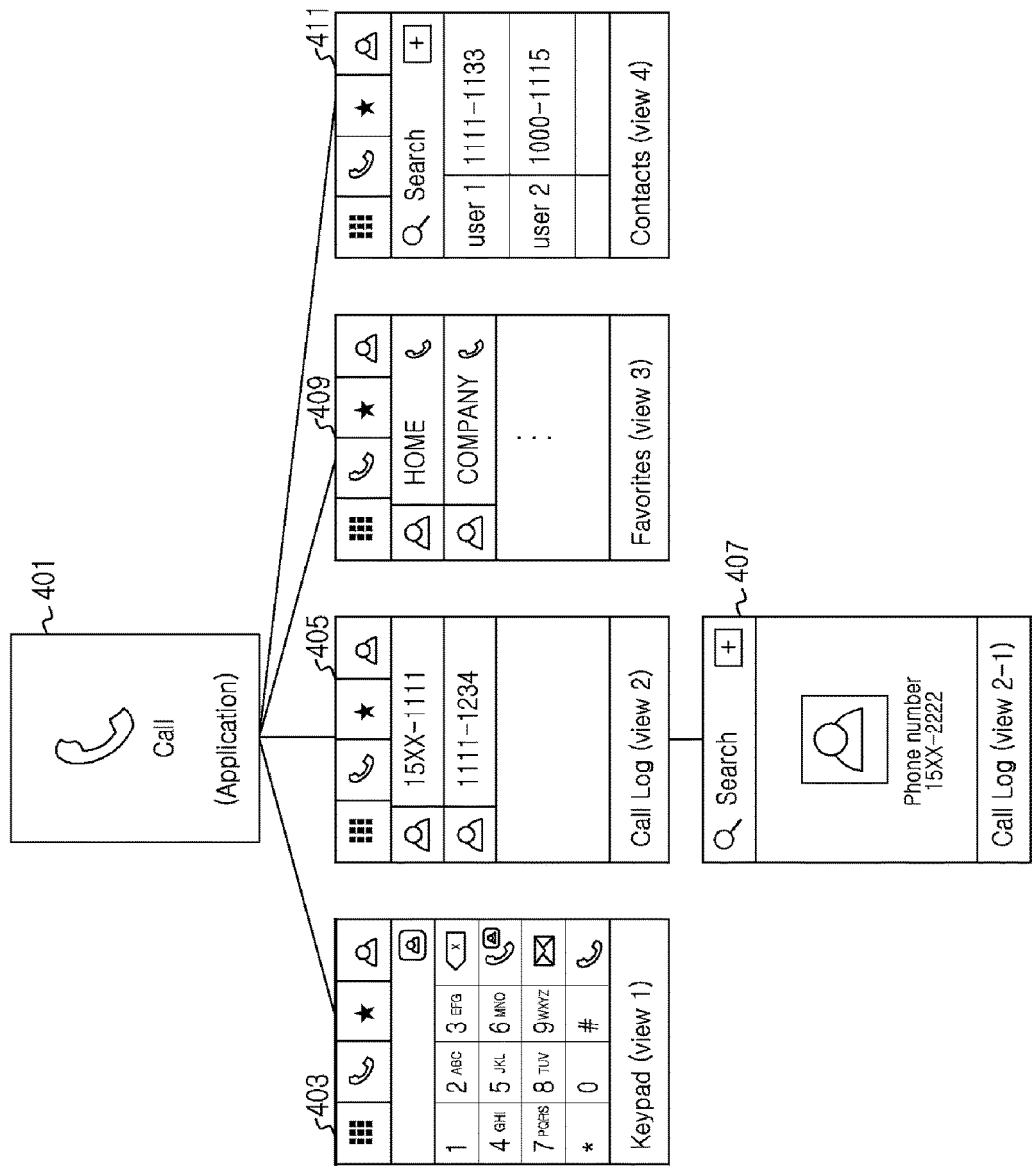

[Fig. 5a]
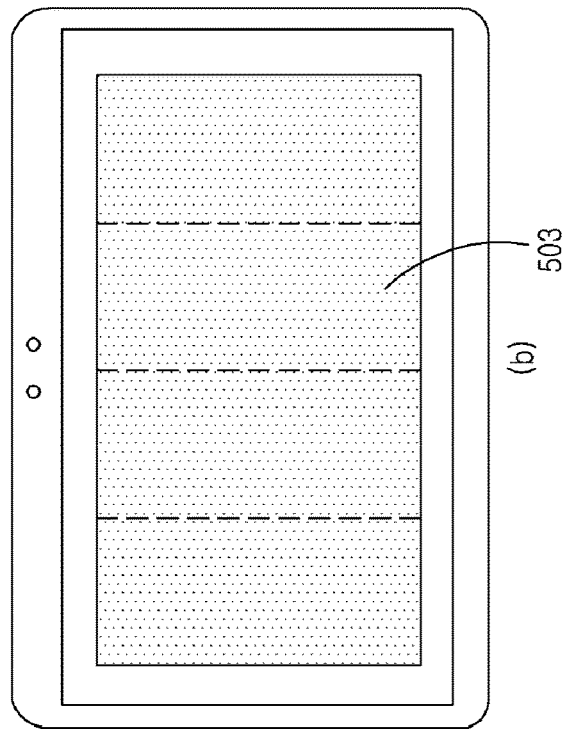
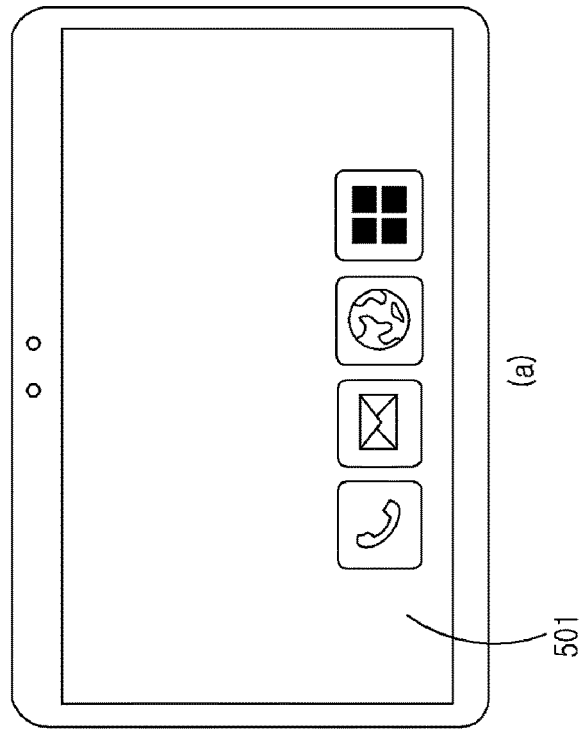

[Fig. 5b]
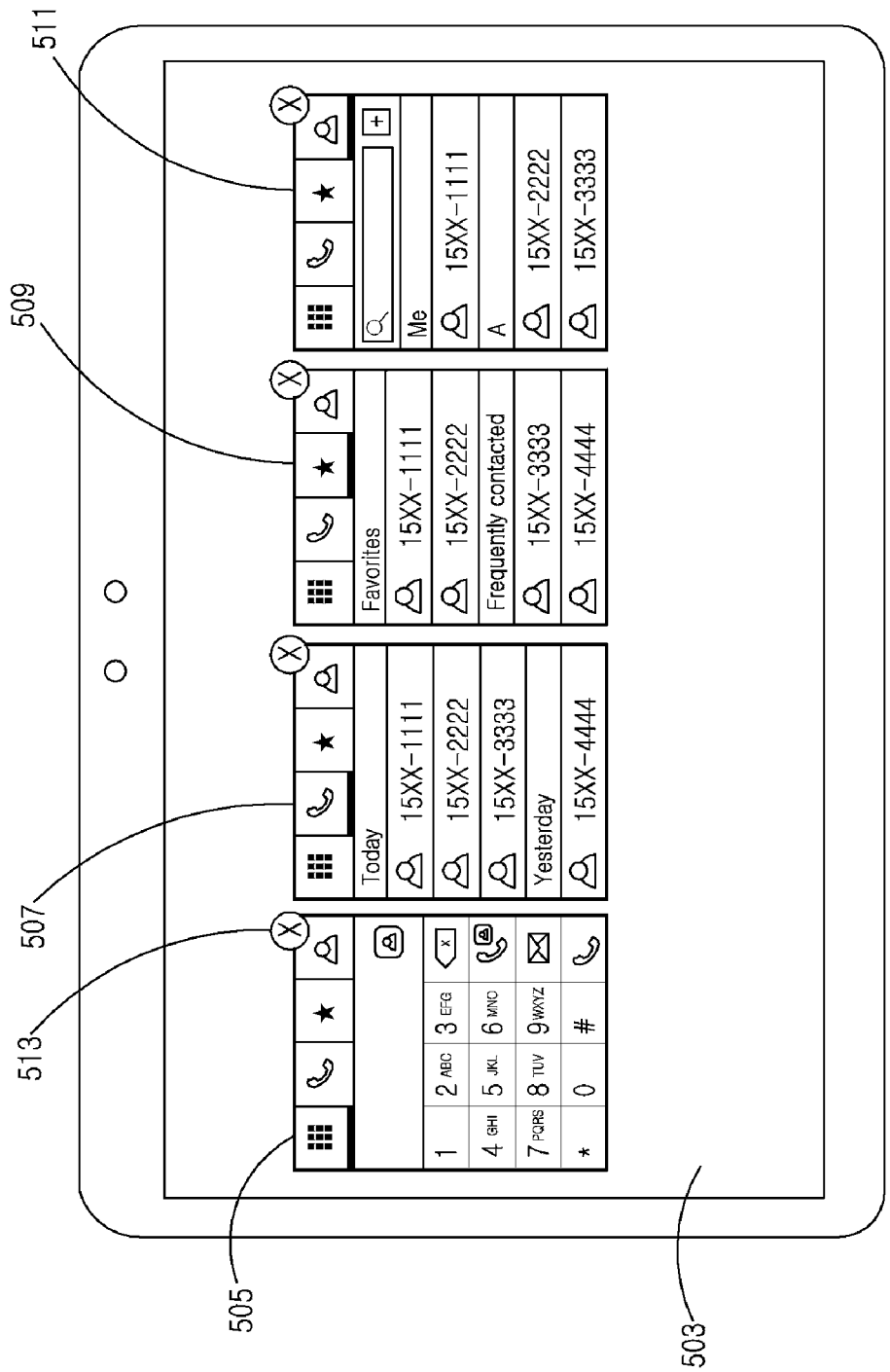

[Fig. 6]
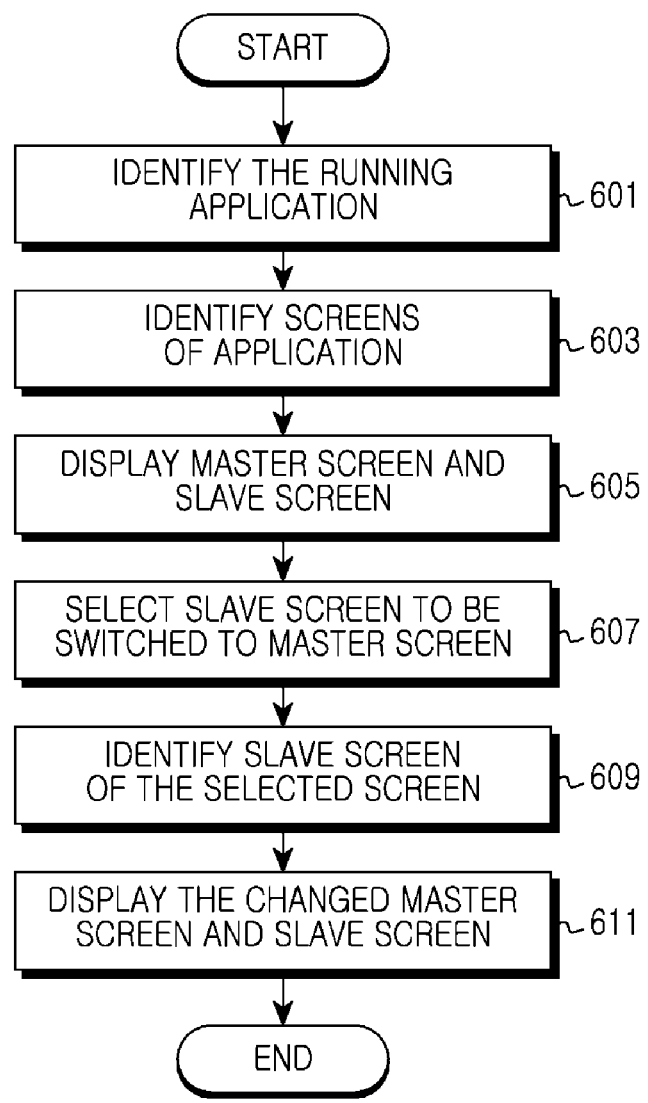

[Fig. 7]
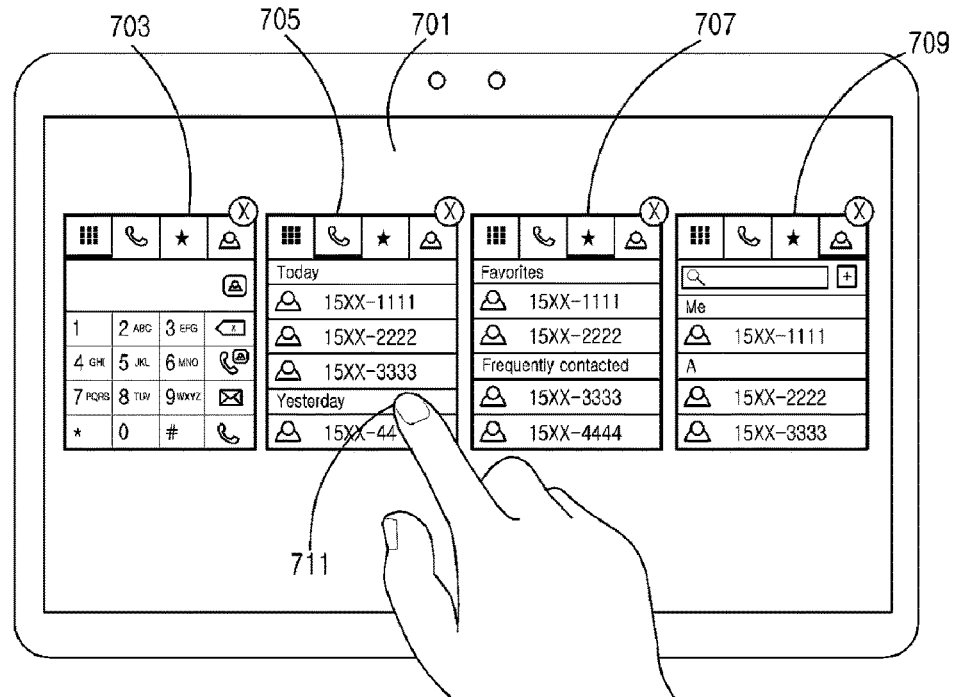
A
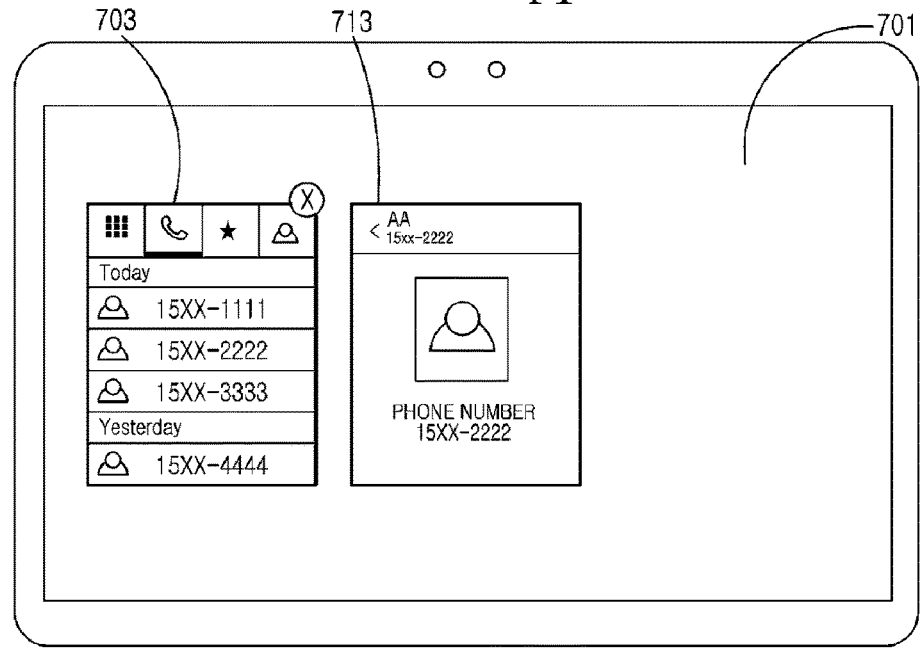
B

[Fig. 8]
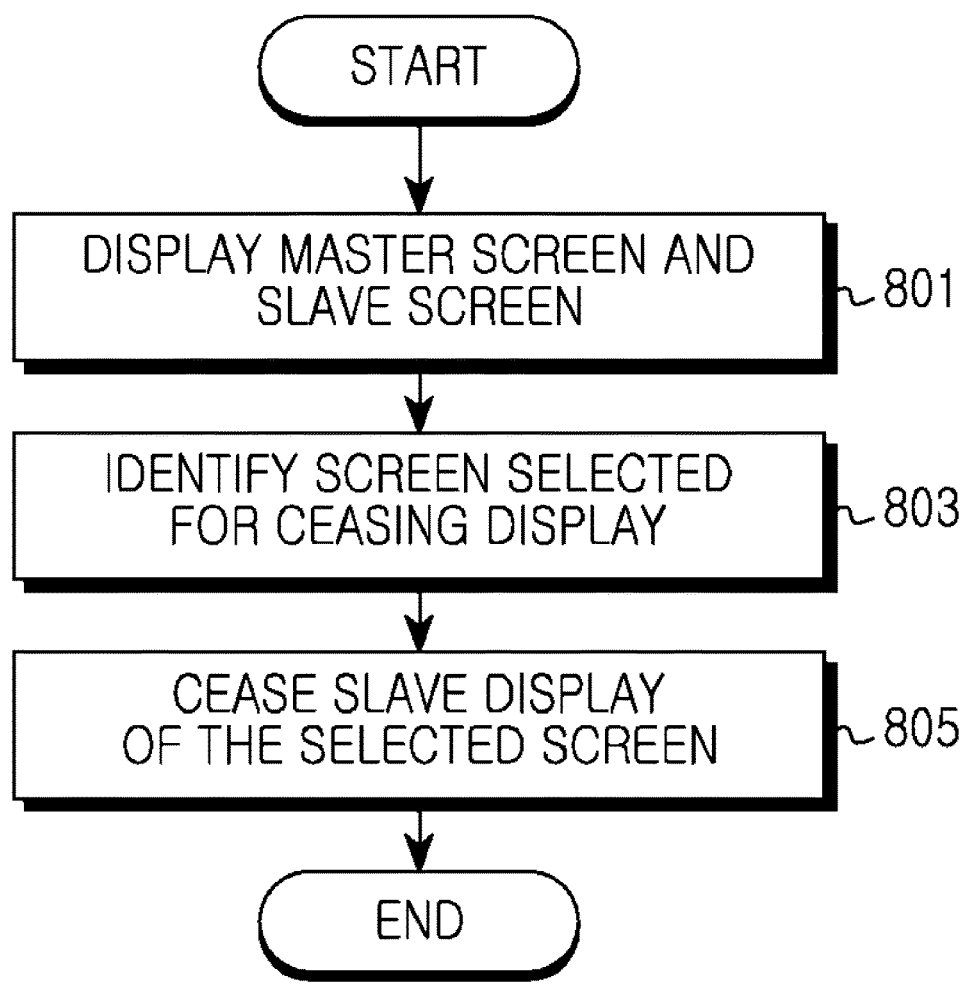

[Fig. 9]
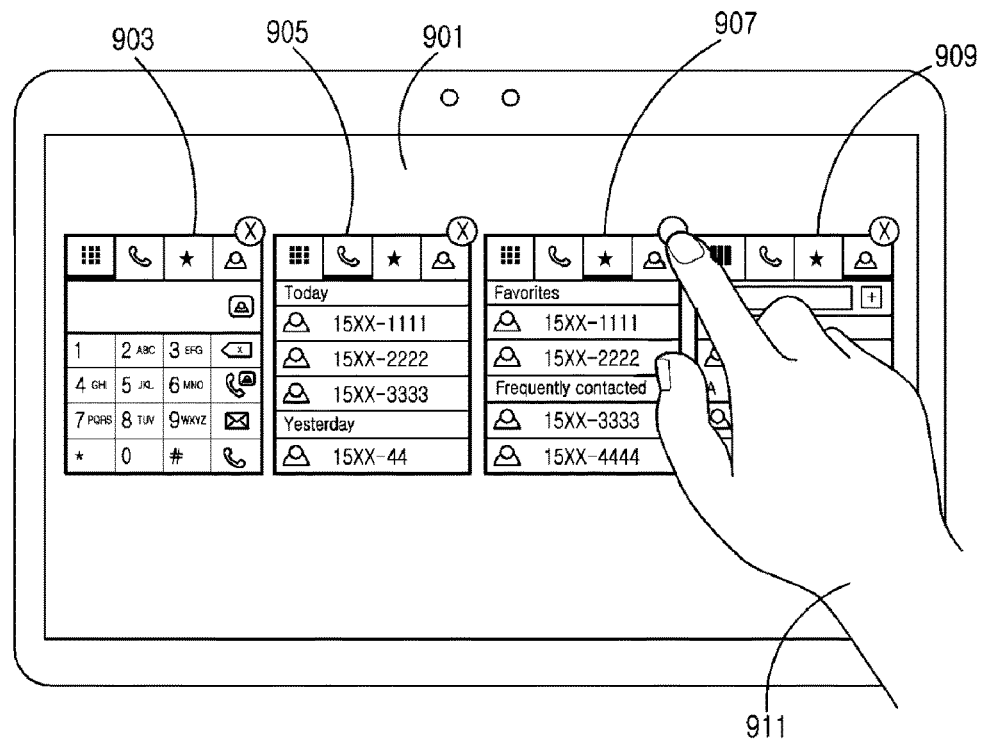
A
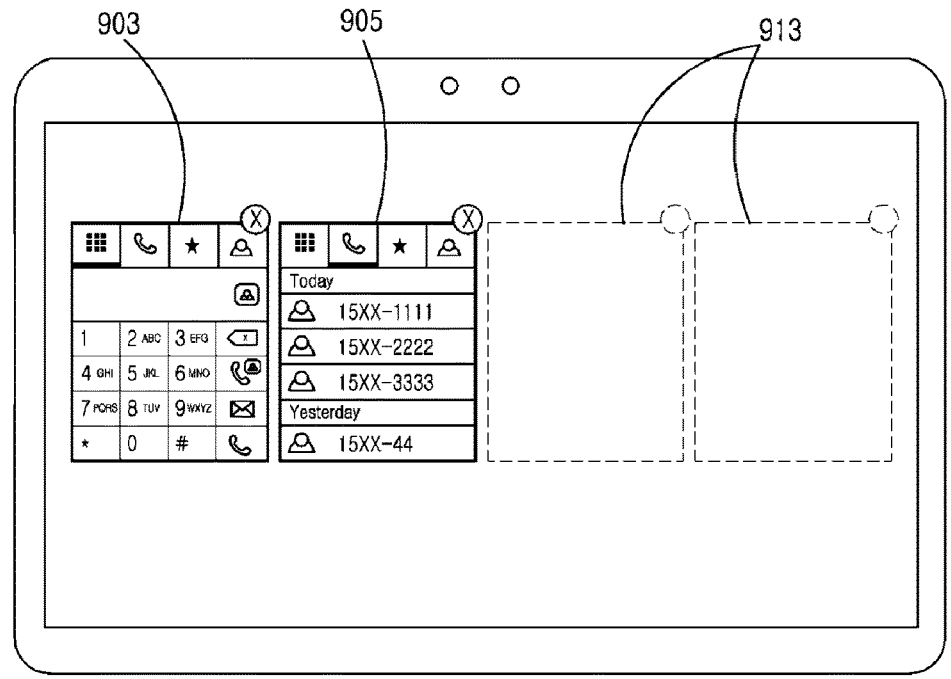
B

[Fig. 10]
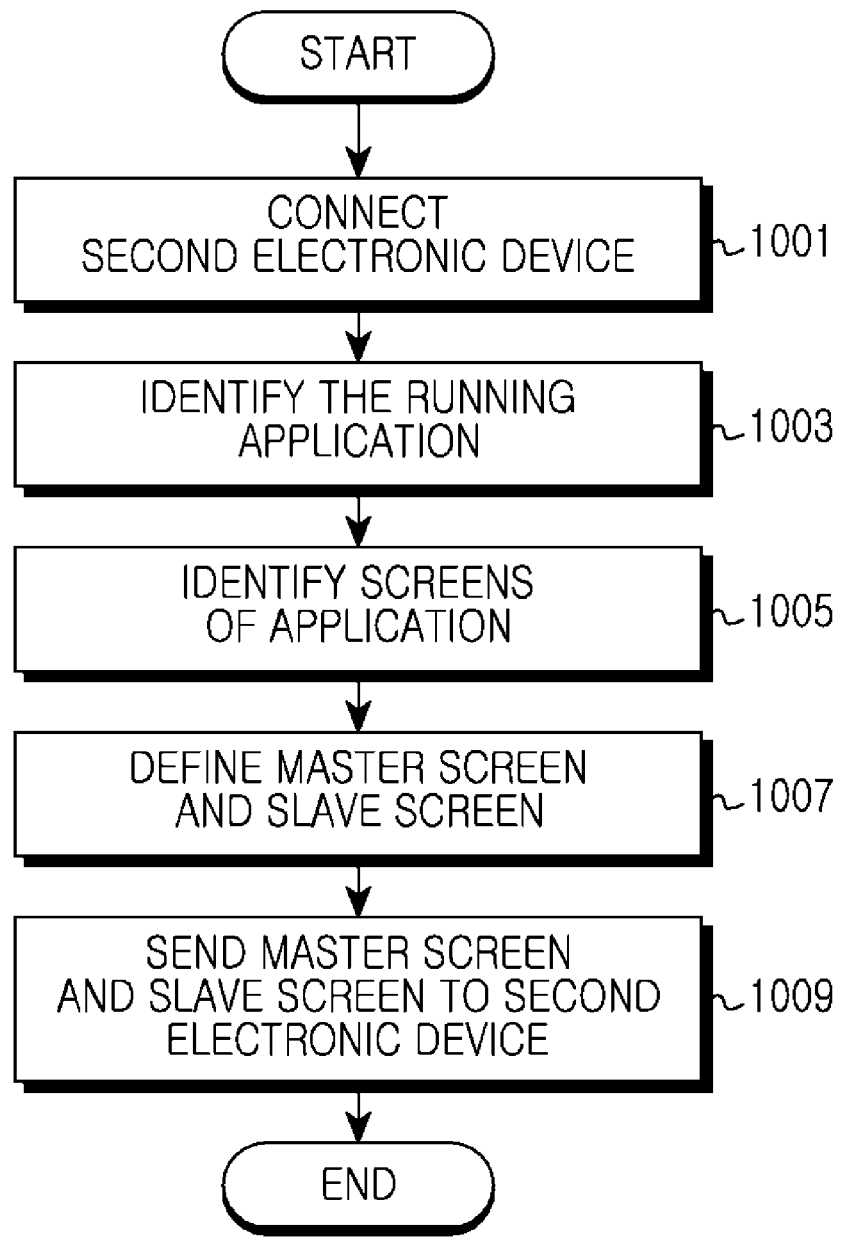

[Fig. 11a]
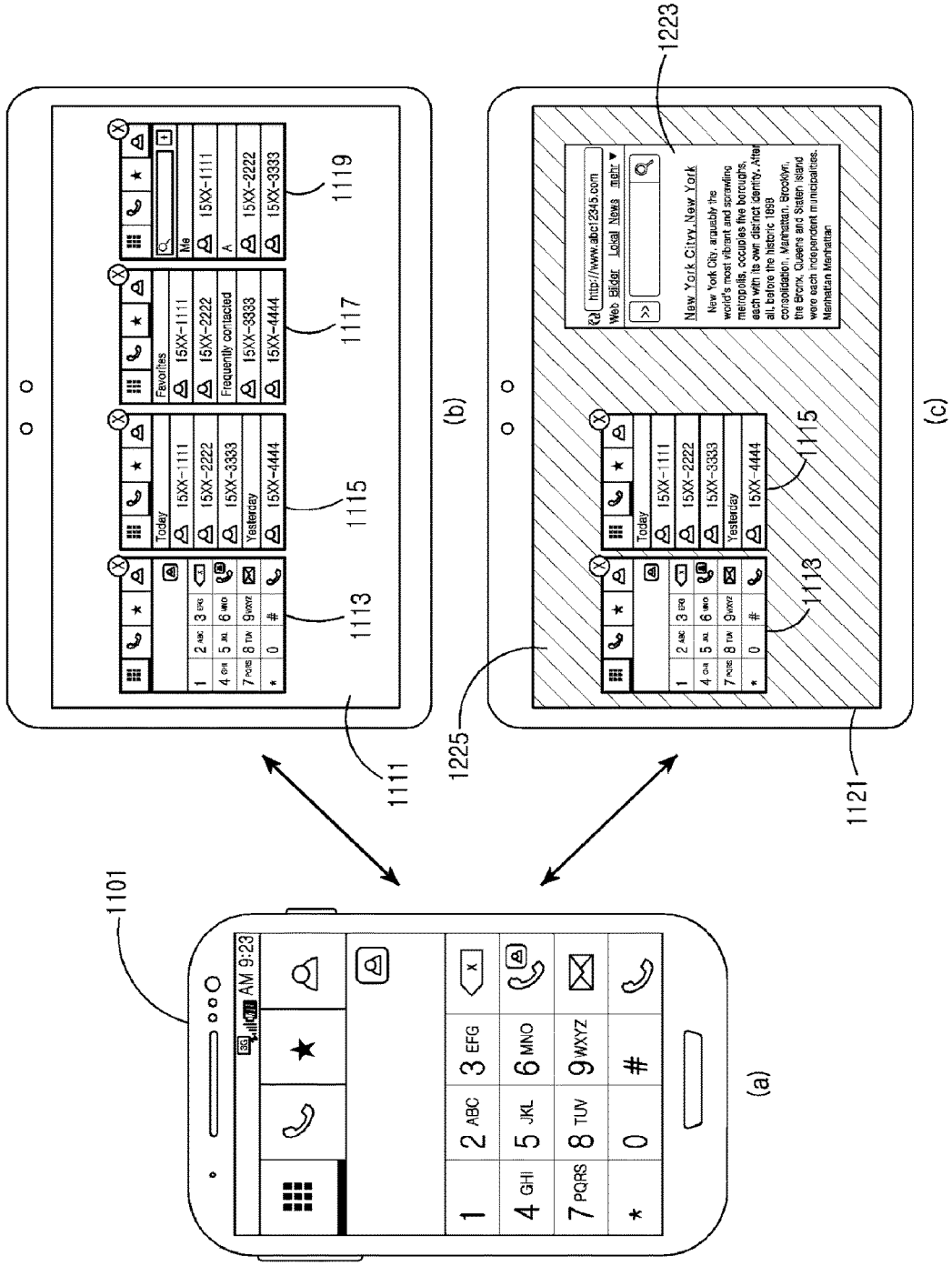

[Fig. 11b]
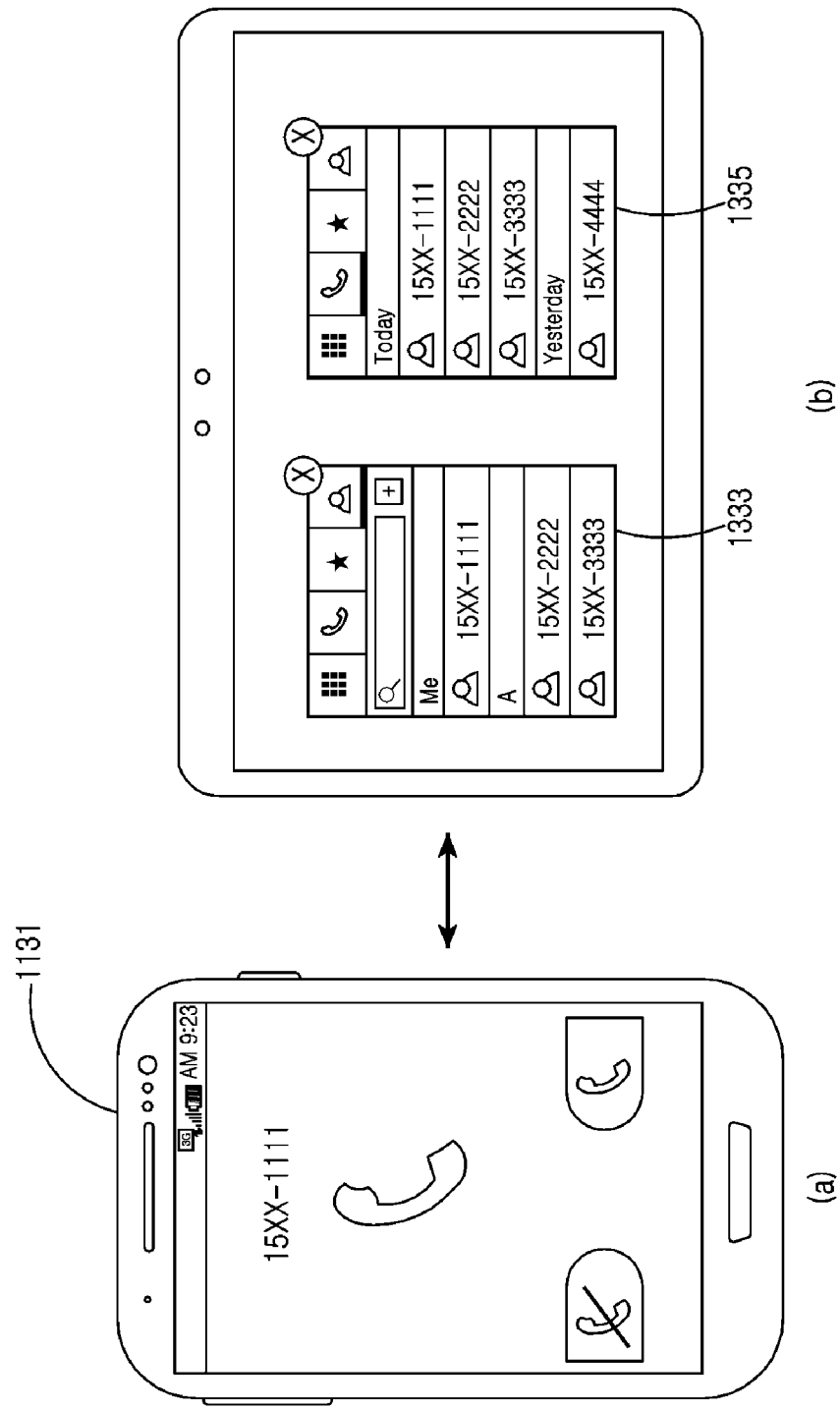

[Fig. 12]
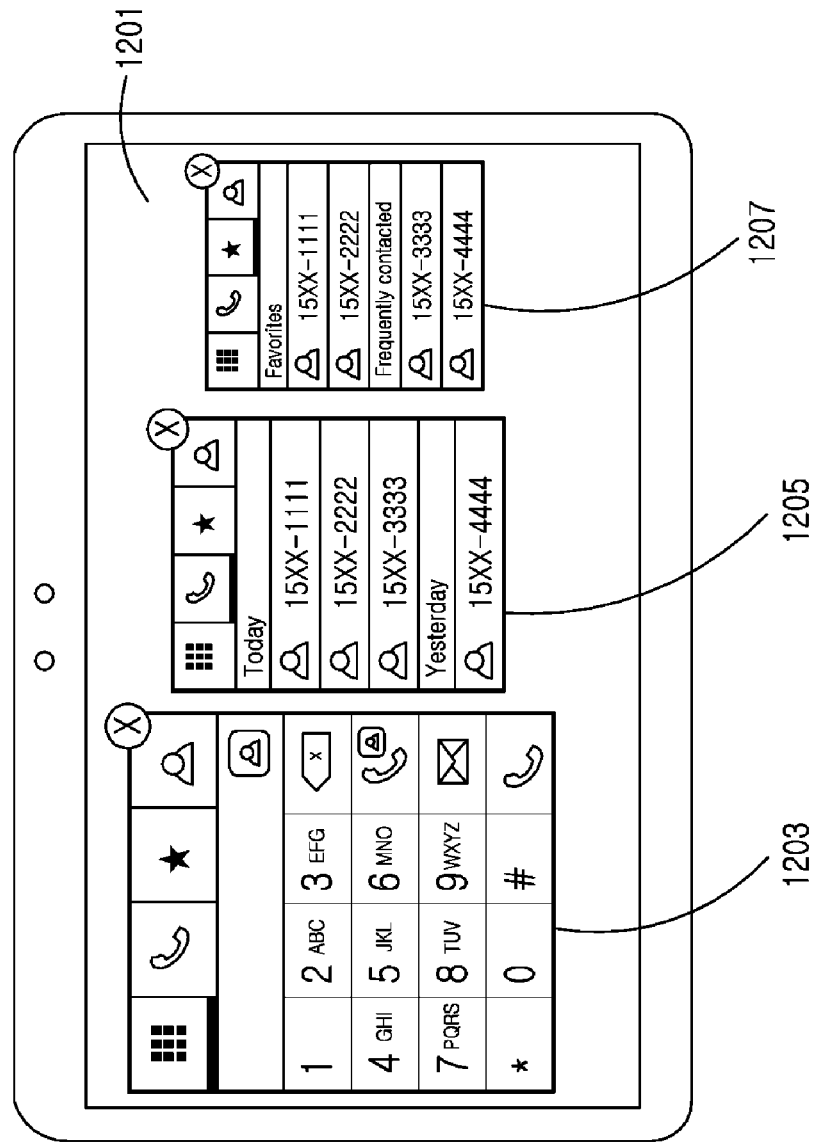

[Fig. 13]
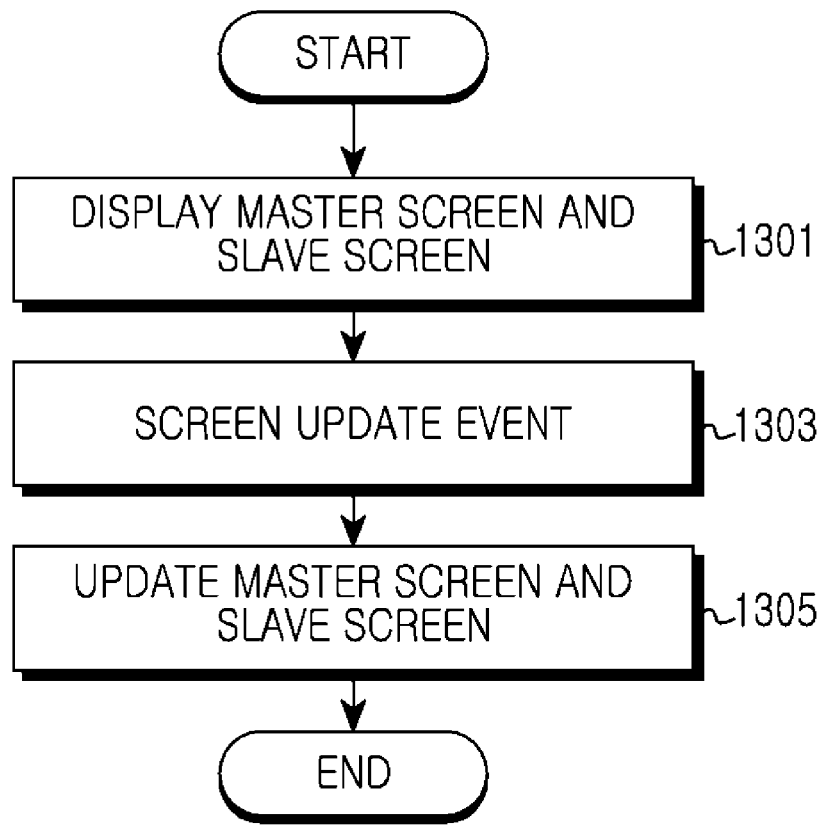

[Fig. 14]
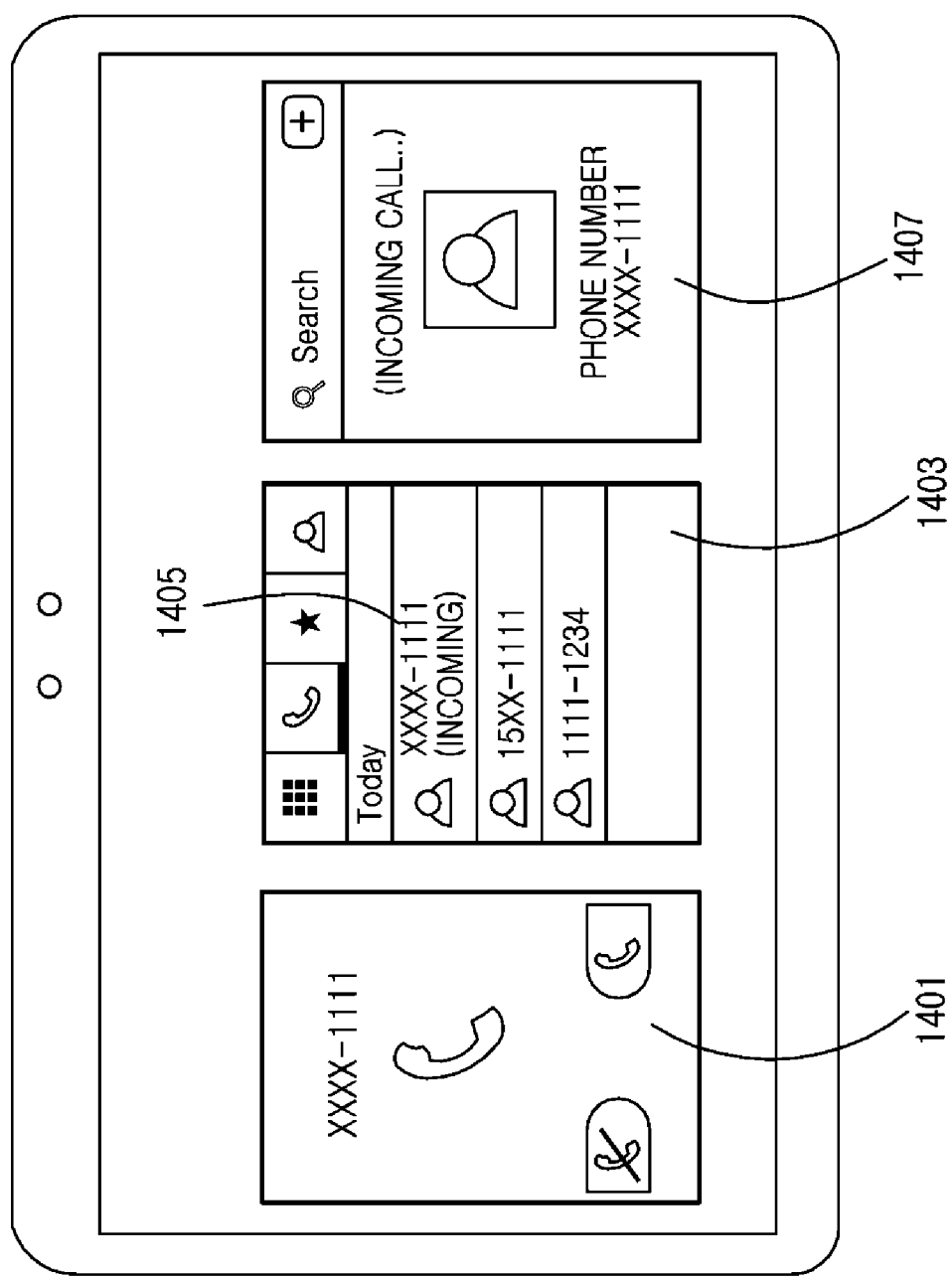

[Fig. 15a]
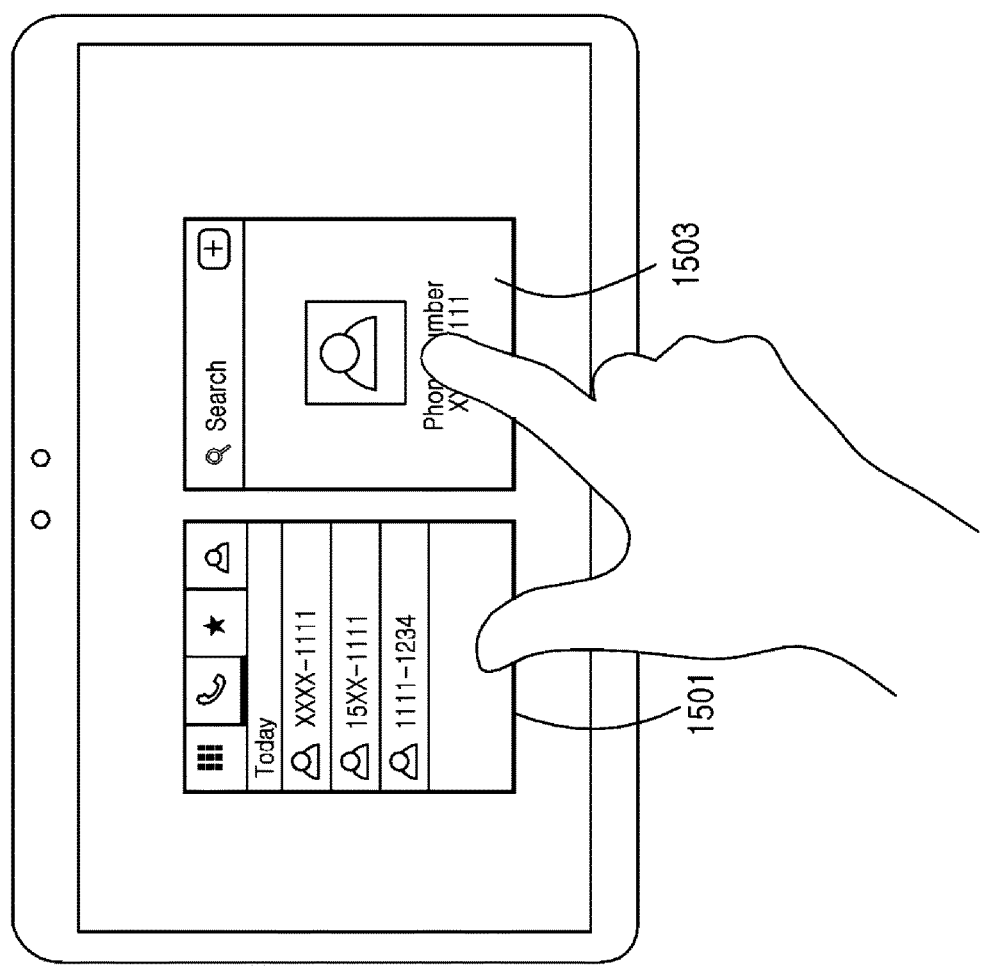

[Fig. 15b]
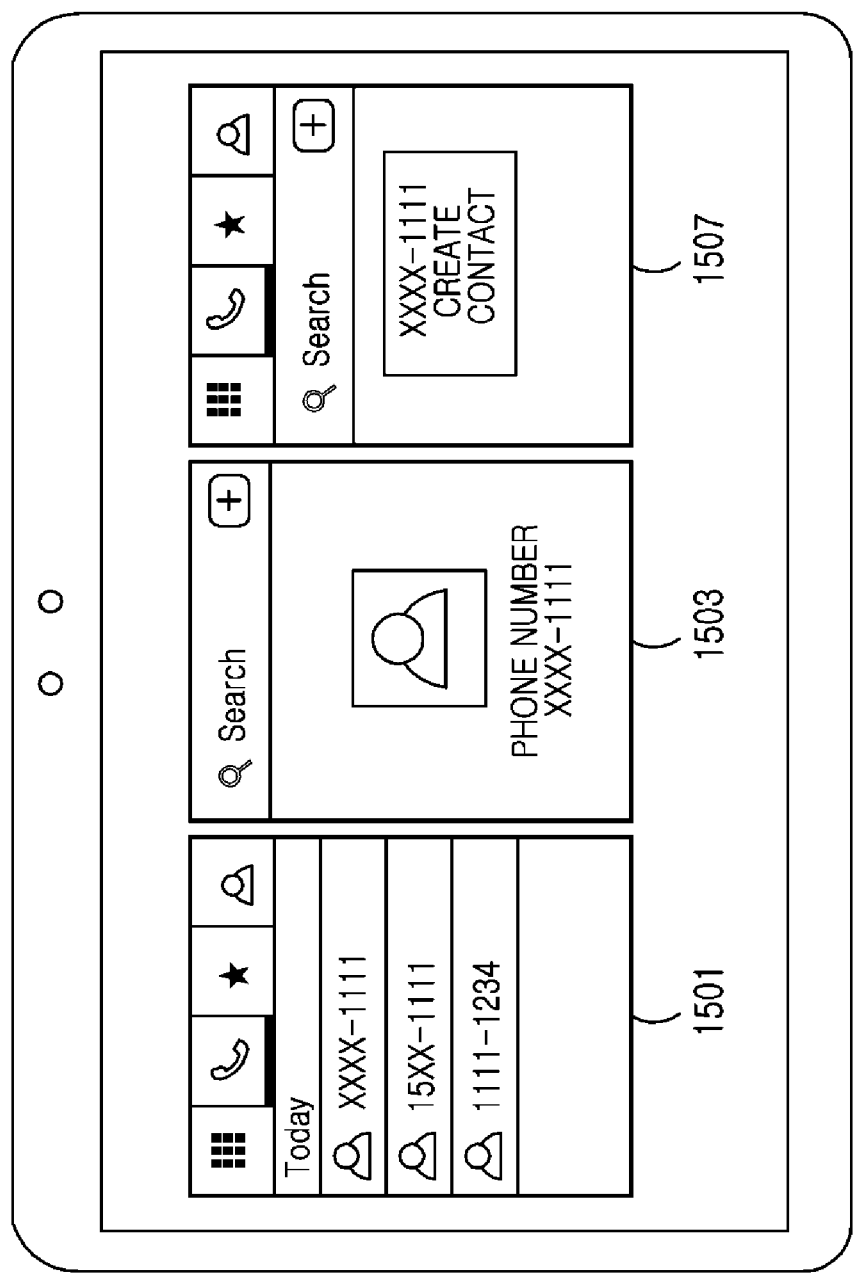

[Fig. 16]
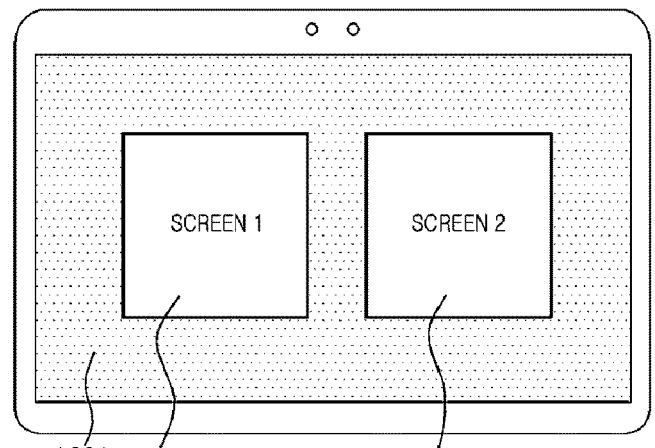
A
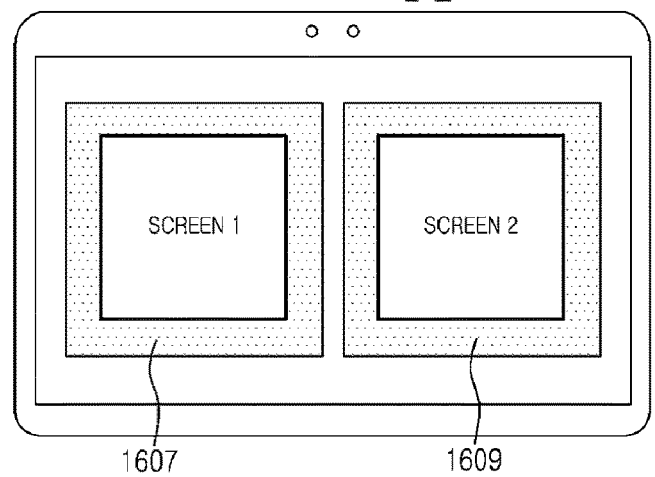
B
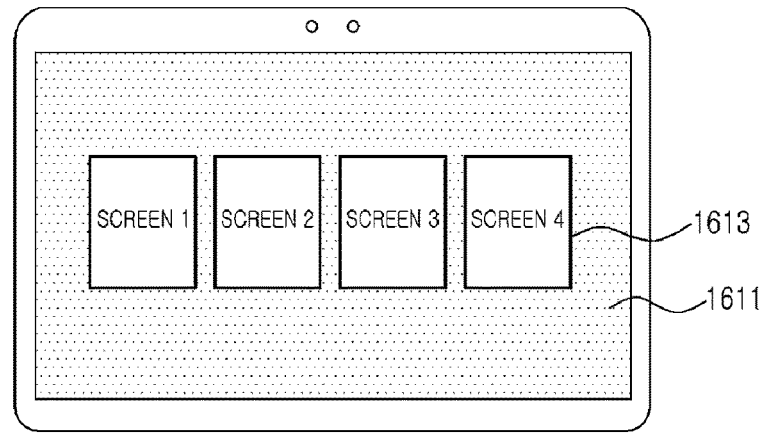
C

[Fig. 17]
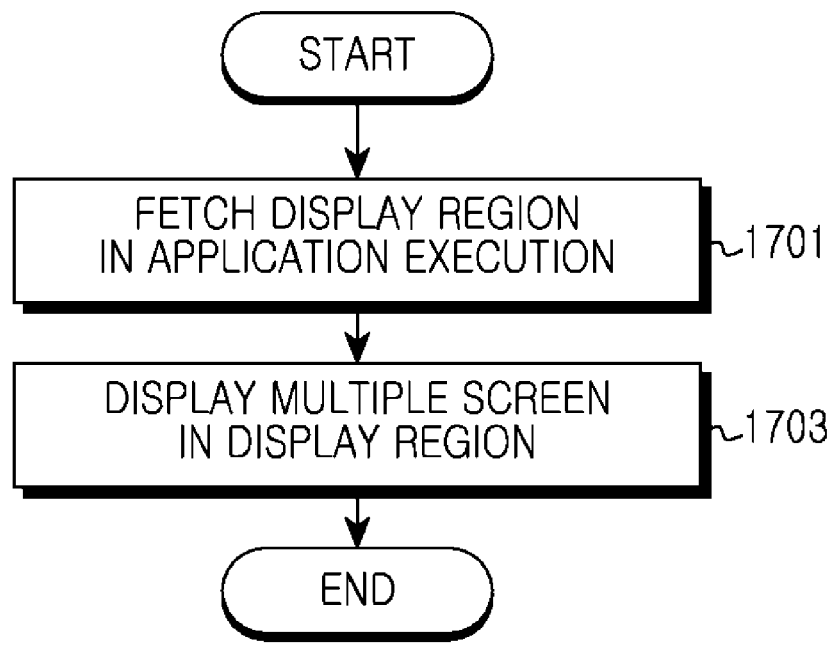

METHOD FOR DISPLAYING AND AN ELECTRONIC DEVICE THEREOF

TECHNICAL FIELD

The present disclosure relates generally to a method for displaying and an electronic device thereof.

BACKGROUND ART

Based on rapid development of electronic devices, the electronic device allowing information or data exchange are used in various fields. Typically, the electronic device includes a display means for displaying application execution. For example, the electronic device can play digital content through the display means. For example, the electronic device can display a web search screen using a browser through the display means.

As such, the application can include one or more screens, and the screen can be fetched and displayed in a display region such as window or layer.

FIGS. 1A, 1B and 1C depict an application execution in the electronic device.

The electronic device can display available application information 101 as shown in FIG. 1A. For example, the electronic device can display a menu for executing a call application, a message application, a web application, or a program list application.

When detecting the input for the application execution, the electronic device can fetch a display region 103 for the application as shown in FIG. 1B. For example, when detecting the input for the call application execution, the electronic device can fetch the display region for displaying a dial screen, a call log screen, a favorite screen, or a contact screen of the call application.

The electronic device can fetch and display the screen corresponding to the input of the call application screens, in the display region as shown in FIG. 1C. For example, the electronic device can display the dial screen 105 in the display region.

DISCLOSURE OF INVENTION

Solution to Problem

To address the above-discussed deficiencies of the prior art, it is a primary aspect of the present disclosure to provide an apparatus and a method for displaying a plurality of screens for an application in an electronic device.

Another aspect of the present disclosure is to provide an apparatus and a method for fetching and displaying a master screen and a slave screen of an application executed in an electronic device.

Yet another aspect of the present disclosure is to provide an apparatus and a method for providing a master screen and a slave screen of an application executed in an electronic device, to second electronic device.

Still another aspect of the present disclosure is to provide an apparatus and a method for controlling a master screen and a slave screen in an electronic device.

According to one aspect of the present disclosure, an electronic device includes a display; and a processor. The processor includes a screen management module for displaying a display region for displaying a screen when an application is executed and fetching a plurality of screens to be displayed in the display region, and a display module for displaying the screen fetched by the screen management module in the display region.

According to another aspect of the present disclosure, a display method of an electronic device includes displaying a display region for displaying a screen when an application is executed; and fetching and displaying a plurality of screens in the display region.

According to yet another aspect of the present disclosure, a computer-readable recording medium contains a program for displaying a display region to display a screen when an application is executed, and fetching and displaying a plurality of screens in the display region.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF DRAWINGS

The above and other aspects, features, and advantages of certain exemplary embodiments of the present disclosure will be more apparent from the following description taken in conjunction with the accompanying drawings, in which:

FIGS. 1A, 1B and 1C illustrate application execution in an electronic device;

FIG. 2 illustrates an electronic device according to an exemplary embodiment of the present disclosure;

FIG. 3 illustrates a method for displaying an execution screen in the electronic device according to an exemplary embodiment of the present disclosure;

FIG. 4 illustrates an application screen according to an exemplary embodiment of the present disclosure;

FIGS. 5A and 5B illustrate application execution in the electronic device according to an exemplary embodiment of the present disclosure;

FIG. 6 illustrates a method for changing the execution screen in the electronic device according to an exemplary embodiment of the present disclosure;

FIGS. 7A and 7B illustrate screen control of the electronic device according to an exemplary embodiment of the present disclosure;

FIG. 8 illustrates a method for changing the execution screen in the electronic device according to an exemplary embodiment of the present disclosure;

FIGS. 9A and 9B illustrate the screen control of the electronic device according to an exemplary embodiment of the present disclosure;

FIG. 10 illustrates a method for displaying the execution screen in the electronic device according to an exemplary embodiment of the present disclosure;

FIGS. 11A and 11B illustrate the screen control of the electronic device according to an exemplary embodiment of the present disclosure;

FIG. 12 illustrates the screen display of the electronic device according to an exemplary embodiment of the present disclosure;

FIG. 13 illustrates a method for controlling the screen in the electronic device according to an exemplary embodiment of the present disclosure;

FIG. 14 illustrates the screen display of the electronic device according to an exemplary embodiment of the present disclosure;

FIGS. 15A and 15B illustrate the screen display of the electronic device according to an exemplary embodiment of the present disclosure;

FIGS. 16A, 16B and 16C illustrate the screen display of the electronic device according to an exemplary embodiment of the present disclosure; and FIG. 17 illustrates a method for displaying the screen in the electronic device according to an exemplary embodiment of the present disclosure.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A touch screen used in various electronic devices fulfills information input and display on a single screen. The electronic device including the touch screen can display an application execution screen with the input received from, for example, a finger, a stylus pen, a digital pen, a voice command, or a sensor. For example, the electronic device can display a web screen, a content (e.g., image, video, e-book) play screen, a game play screen, a memo screen, or a schedule screen based on the input.

The application can include one or more display regions, for example, one or more screens such as windows or layers, and the screen of the application can be subordinate to the other screen. For example, the subordinate relationship between the screens can include switch relationship of the screens.

The electronic device can fetch a slave screen (e.g., a parent screen or a child screen) of a master screen displayed by managing the application screen. The electronic device can display the master screen together with the slave screen in the display region. For example, a call application can include the slave screen such as dial screen, call log screen, favorite screen, or contact screen. As displaying the dial screen according to the call application execution, the electronic device can display the slave screen such as call log screen, favorite screen, or contact screen.

The electronic device can include a device having a communication function, for example, one or a combination of various devices such as smart home, tablet Personal Computer (PC), mobile phone, video phone, e-book reader, desktop PC, laptop PC, netbook computer, Personal Digital Assistant (PDA), Portable Multimedia Player (PMP), MP3 player, mobile medical device, electronic bracelet, electronic necklace, electronic accessory, camera, wearable device, electronic clock, wrist watch, smart white appliances (e.g., refrigerator, air conditioner, vacuum cleaner, artificial intelligence robot, television (TV), Digital Video Disk (DVD) player, audio system, oven, microwave oven, washer, air cleaner, digital frame), medical equipment (e.g., Magnetic Resonance Angiography (MRA), Magnetic Resonance Imaging (MRI), Computed Tomography (CT), X-ray machine, scanner), navigation device, Global Positioning System (GPS) receiver, Event Data Recorder (EDR), Flight Data Recorder (FDR), set-top box, TV box (e.g., Samsung HomeSync™, AppleTV™, or GoogleTV™), electronic dictionary, vehicle infotainment device, electronic equipment for ship (e.g., marine navigation system, gyrocompass), avionics, security device, electronic apparel, electronic key, camcorder, game console, Head-Mounted-Device (HMD), flat panel display device, electronic album, furniture or part of building/structure having the communication function, electronic board, electronic signature receiving device, or projector. It is apparent that the electronic device of the present disclosure is not limited to those devices.

FIG. 2 is a block diagram of an electronic device according to an exemplary embodiment of the present disclosure. Referring to FIG. 2, the electronic device 200 can include a memory 210, a processor unit 220, an audio processor 230, a communication system 240, an Input Output (IO) control module 250, a touch screen 260, and an input device 270. Herein, the electronic device 200 can include a plurality of at least one of the components. The components are explained individually.

The memory 210 can include a program storage 211 for storing a program to control operations of the electronic device 200 and a data storage 212 for storing data generating in program execution. For example, the data storage 212 can store updatable data such as phonebook, outgoing message, and incoming message, and information of a display region for displaying the application screen. For example, the data storage 212 can store information relating to a location, a size, and a direction of the application screen.

The program storage 211 can include an operating system program 213, a screen management program 214, a display program 215, and at least one application program 216. Herein, the program in the program storage 211 may be referred to as an instruction set which is a set of instructions.

The operating system program 213 can include various software components for controlling general system operations. These include, e.g., memory management and control, storage hardware (device) control and management, and power control and management. The operating system program 213 can also process normal communication between various hardware (devices) and software components (modules).

The screen management program 214 can include various software components for managing the application screen. The screen management program 214 can manage the slave screen of the application screen. For example, the screen management program 214 can process to fetch and display the slave screen of the displayed screen.

The screen management program 214 can dump every screen displayed in the application execution and then manage the master screen and the slave screen per screen. For example, the screen management program 214 can give an identifier to each screen and manage the application screens in a tree structure using the given identifiers.

The screen management program 214 can display the master screen and the slave screen by expanding the fetched display region. For example, the screen management program 214 can display the master screen and the slave screen using a plurality of display regions. For example, the screen management program 214 can fix the size of the fetched display region, display the master screen in a first size, and display the slave screen in a second screen smaller than the first size.

The screen management program 214 can process to provide the master screen and the slave screen of the running application to a second electronic device.

The display program 215 can include various software components for providing and displaying graphics on the touch screen 260. The term 'graphics' can embrace a text, a webpage, an icon, a digital image, a video, and an animation.

The display program 215 can include various software components for a user interface.

The display program 215 can process to display a plurality of screens in the application execution. The display program 215 can process to display the master screen and the slave screen together for the running application.

When the multiple screens are displayed and an input for aborting the screen display is detected, the display program 215 can process to stop displaying the selected screen and the slave screen of the selected screen.

When the screen is switched, the display program 215 can process to display the slave screen of the switched screen.

The display program 215 can process to separately display the master screen and the slave screen.

The application program 216 can includes a software component for at least one application program installed in the electronic device 200. The application program 216 can also include the program for displaying the multiple screens in the application execution as stated above. This implies that the function for displaying the multiple screens in the application execution can be provided as one application.

The program in the program storage 211 can be hardware. For example, the electronic device can include an operating system module, a screen management module, a display module, and an application program module.

The processor unit 220 can include at least one processor 222 and an interface 224. Herein, the processor 222 and the interface 224 can be integrated onto at least one integrated circuit or embodied separately.

The interface 224 can function as a memory interface for controlling access of the processor 222 and the memory 210. The interface 224 can function as a peripheral interface for controlling connection between an IO peripheral of the electronic device 200, and the processor 222.

The processor 222 can control the electronic device 200 to display the multiple screens for the running application using at least one software program. For example, in the application execution, the processor 222 can control to display the master screen together with the slave screen of the running application. For example, the function of the electronic device 200 for displaying the multiple screens in the application execution can be fulfilled using the software such as program stored in the memory 210 or the hardware such as processor 222.

The audio processor 230 can provide an audio interface between the user and the electronic device 200 through a speaker 231 and a microphone 232.

The communication system 240 can perform a communication function for voice communication and data communication of the electronic device 200. The communication system 240 may be divided into a plurality of communication submodules for supporting different communication networks. For example, the communication networks can include, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, and Near Field Communication (NFC). The communication system 240 includes a wired, wireless, medium communication network for connecting to the second electronic device, and can send the master screen and the slave screen of the running application to the second electronic device.

The IO control module 250 can provide an interface between the IO device such as touch screen 260 or input device 270, and the interface 224.

The touch screen 260, which is the IO device for outputting and inputting information, can include a touch input part 261 and a display 262.

The touch input part 261 can provide touch information detected through a touch panel, to the processor unit 220 via the IO control module 250. In so doing, the touch input part 261 converts the touch information to an instruction such as touch_down, touch_move, and touch_up and provides the instruction to the processor unit 220. The touch input part 261 can issue the input for executing the application, the input for switching the execution screen, and the input for ceasing the display.

The display 262 can display status information of the electronic device 200, a character input by the user, a moving picture, and a still picture. For example, the display 262 can display the master screen and the slave screen of the application.

The input device 270 can provide input data generated by the user's selection to the processor unit 220 through the IO control module 250. For example, the input device 270 can include only a control button to control the electronic device 200. For example, the input device 270 can include a keypad for receiving the input data from the user, and issue the input for executing the application, the input for switching the execution screen, and the input for ceasing the display.

The electronic device 200 can further include elements (not shown) for providing additional functions, such as broadcasting receiver module for receiving the broadcasting, digital music player module such as MP3 module, close-range wireless communication module for close-range wireless communication, image sensor for capturing image data, and proximity sensor module for sensing proximity, and their software.

As such, the electronic device includes the display and the processor. The processor can include a screen management module for fetching the display region for displaying the screen in the application execution and fetching the multiple screens to be displayed in the fetched display region, and a display module for displaying the screen fetched by the screen management module in the display region.

The processor can analyze the screens of the running application, and define and display the master screen and the slave screen.

The processor can display the master screen and the slave screen in different sizes.

The processor can change at least one slave screen of the displayed screens to the master screen by detecting the input, and display the slave screen of the changed master screen.

The processor can display at least one of the displayed screens by detecting the input, and stop displaying the slave screen of the selected screen.

The processor can display the multiple screens by expanding the display region.

The processor can display the multiple screens by fetching a plurality of display regions.

The processor can display the multiple screens of the adjusted size in the display region.

The processor can provide the displayed screens to the second electronic device.

When the screen is updated, the processor can update the updated screen and the slave screen of the updated screen.

The processor can display the multiple slave screens to overlap partially.

FIG. 3 is a flowchart of a method for displaying the execution screen in the electronic device according to an exemplary embodiment of the present disclosure.

Referring to FIG. 3, the electronic device can identify the running application in step 301. The electronic device can identify the application to run by detecting an input from an input means such as finger or digital pen, a voice command input, or a hardware key input.

In step 303, the electronic device can identify the screens of the application. The electronic device can identify the application screen and its slave screen. The application can include one or more screens, and the screen can be subordinate to the other screen. For example, when the input can switch a current first screen to a second screen or a third screen. When the second screen can be switched to a fourth screen, the second screen and the third screen can become the slave screens of the first screen being the master screen and the fourth screen can become the slave screen of the second screen being the master screen.

In step 305, the electronic device can define the application screens as the master screen and the slave screen. The master screen of the application is an initial screen which is displayed in the application execution, and can employ a predefined screen or the last execution screen of the previous operation. For example, the electronic device can display a predefined default screen of the application execution or the last screen of the previous operation. For example, the master screen can use one screen selected by the user from the running application screens.

The master screen can be switched to the slave screen. For example, the call application can include the dial screen, the call log screen, the favorite screen, and the contact screen. The call log screen, the favorite screen, or the contact screen switchable from the dial screen can be the slave screen of the dial screen being the master screen. For example, since the call log screen can switch to a detailed information screen of the user of the call logs, the call log screen can become the master screen and the detailed information screen can become the slave screen.

In step 307, the electronic device can display the master screen and the slave screen of the running application. For example, when the master screen of the call application displays the dial screen, the electronic device can display the dial screen together with the call log screen, the favorite screen, or the contact screen.

The electronic device can display the master screen and the slave screen in the display region.

The electronic device can fetch the display region of a predefined size in the application execution, and display the master screen and the slave screen by expanding the fetched display region. For example, the electronic device can secure a region for expanding the display region and then expand at least one side of the displayed screen upwards, downwards, to the left, to the right, or crosswise.

The electronic device can display the master screen and its slave screen by adding other display region. For example, the electronic device can display the master screen in a first region displayed and the slave screen in a second display region newly added.

After fixing the size of the fetched display region, the electronic device can display the master screen in the first size and the slave screen in the second size smaller than the first size.

In the application execution, the electronic device can display the slave screen besides the master screen. The electronic device can overlap at least part of the slave screens. For example, when the electronic device cannot display both of the master screen and its slave screen in the display region, it can adjust the size of the master screen or the slave screen. For example, the electronic device can overlap the displayed slave screens. The electronic device can change the display order of the overlapping slave screens according to the input.

FIG. 4 depicts an application screen according to an exemplary embodiment of the present disclosure.

Referring to FIG. 4, the application can include one or more screens. For example, a call application 401 can include a dial screen 403, a call log screen 405, a favorite screen 409, and a contact screen 411. When the call application 401 is executed, the default screen can be displayed. For example, when the call application 401 is executed, a previous screen can be initially displayed. The initial display screen of the application can be defined as the master screen.

The screens of the application can be subordinate to the other screen. For example, the subordinate relationship between the screens can indicate the screen switch, and the screen subordinate to the master screen can be defined as the slave screen. For example, according to a menu input of the screen, the dial screen 403 can be switched to the call log screen 405, the favorite screen 409, or the contact screen 411, and the switched screens can be the slave screens of the dial screen 401 being the master screen. For example, the call log screen 405 can be switched to the dial screen 401, the favorite screen 409, the contact screen 411, or a detailed information screen 407 of the contact of the call log 405 according to the menu input, and such screens can become the slave screens of the call log screen 405 being the master screen. For example, the detailed information screen 407 of the contact can be switched to the call log screen 405, the dial screen 401, a message input screen, or a video call screen according to the menu input, and such screens can become the slave screens of the detailed information screen 407.

The master screen can be higher than the slave screen, and the slave screen can be lower than the master screen.

The electronic device can manage one or more screens of the application. Herein, the screen management can display or control all the screens of the application. The electronic device can dump every screen displayed in the application execution and then manage the master screen and the slave screen per screen. For example, the electronic device can give the identifier to each screen dumped and manage the application screens in the tree structure using the given identifiers.

The electronic device can display the master screen and the slave screen together of the running application. For example, when the dial screen is displayed, the call log screen, the favorite screen, or the contact screen can be added.

FIGS. 5A and 5B depict the application execution in the electronic device according to an exemplary embodiment of the present disclosure.

The electronic device can display available application information 501 as shown in FIG. 5A. For example, the electronic device can display icons for executing the call application, the message application, the web application, and the program list application.

The application can include one or more display regions, for example, one or more screens such as windows or layers. The electronic device can fetch and display the application screen in the display region.

The electronic device can fetch and divide the display region into a plurality of regions based on the number of the screens. For example, when the application including four screens is executed, the electronic device can display the display region 503 divided to the four regions based on the number of the screens as shown in FIG. 5A.

The electronic device can display different screens in the divided display regions 503 as shown in FIG. 5B. For example, the electronic device can detect the call application execution and accordingly display a dial screen 505, a call log screen 507, a favorite screen 509, and a contact screen 511 in the divided display region 503. The electronic device can also display a menu 513 for ceasing the display of the screen in the divided display regions. The electronic device can remove the screen corresponding to the pressed menu from the display region.

FIG. 6 is a flowchart of a method for changing the execution screen in the electronic device according to an exemplary embodiment of the present disclosure.

Referring to FIG. 6, the electronic device can identify the running application in step 601. The electronic device can identify the running application by detecting the input from the input means such as finger or digital pen, the voice command input, or the hardware key input.

In step 603, the electronic device can identify the application screen. The application can include one or more screens, and the electronic device can identify the screen subordinate to each screen.

In step 605, the electronic device can display the master screen and the slave screen. The master screen can be the initial screen displayed when the application is executed. For example, the master screen can be selected by the user from the screens of the running application. The slave screen can be switched from the master screen.

For example, when the master screen including three slave screens is displayed according to the application execution, the electronic device can display four screens including the master screen and the slave screens.

In step 607, the electronic device can select the slave screen to be switched to the master screen according to the input.

The slave screen switched to the master screen can be selected by the user from the current slave screens.

In step 609, the electronic device can identify the slave screen of the selected screen. The electronic device can define the screen selected by the input as the master screen, and identify the slave screen corresponding to the defined master screen.

For example, when the call application displays the slave screens including the dial screen, the call log screen, the favorite screen, and the contact screen and the call log screen is selected, the electronic device can define the call log screen as the master screen. The electronic device can identify the user detailed information screen or the contact screen of the call log screen, as the slave screen of the call log screen which is defined as the master screen.

In step 611, the electronic device can display the changed master screen and its slave screen.

FIGS. 7A and 7B depict screen control of the electronic device according to an exemplary embodiment of the present disclosure.

Referring to FIGS. 7A and 7B, the electronic device 701 can display the master screen and the slave screen of the running application. The electronic device 701 can display the master screen at a location corresponding to a first priority and display the slave screen at a location defined based on the master screen according to the priority. For example, the electronic device 701 can display the master screen on the left and the slave screens in order to the right from the master screen.

In FIG. 7A, the master screen can include a dial screen 703, and the slave screens can include a call log screen 705, a favorite screen 707, and a contact screen 709.

The electronic device 701 can change the location of the slave screen by detecting the input. For example, when one 711 of the displayed screens is input during a certain time, the electronic device 701 can determine that the screen to move is selected. The electronic device 701 can detect the input for selecting the location to move and thus move the selected screen.

For example, the electronic device 701 can detect the movement input while one of the displayed screens is selected. The electronic device 701 can move the selected screen to the input released location.

When the slave screen is moved to the location of the master screen, the electronic device can define the moved slave screen as the master screen.

The electronic device can display a slave screen 713 of a master screen 703 as shown in FIG. 7B. The electronic device can stop displaying the previous master screen and its slave screen and display the slave screen of the new master screen.

In FIG. 7B, after the master screen and the slave screen of the call application are displayed, the call log screen is defined as the master screen according to the input and accordingly the slave screen of the call log screen is displayed.

FIG. 8 is a flowchart of a method for changing the execution screen in the electronic device according to an exemplary embodiment of the present disclosure.

Referring to FIG. 8, the electronic device can display the master screen and the slave screen of the running application in step 801.

In step 803, the electronic device can identify the screen for ceasing the display. For example, the electronic device can display the master screen and the slave screen including the menu for ceasing the screen display. The electronic device can determine the screen corresponding to the menu of the detected input as the screen to stop displaying.

In step 805, the electronic device can stop displaying the selected screen. For example, the electronic device can cease the display of the selected screen and its slave screen.

FIGS. 9A and 9B depict the screen control of the electronic device according to an exemplary embodiment of the present disclosure.

As shown in FIG. 9A, the electronic device can display a master screen 901 and slave screens of the running application. The master screen can include a dial screen 903, and the slave screens can include a call log screen 905, a favorite screen 907, and a contact screen 909.

The electronic device can remove the screen corresponding to the input from the screens. For example, upon detecting an input 911 to a menu for ceasing the screen display, the electronic device can confirm that the display of the screen corresponding to the input menu is ceased.

The electronic device can remove the screen to stop displaying, from the screens as shown in FIG. 9B. The electronic device can remove the target screen and its slave screens from the screens.

In FIG. 9B, the electronic device, upon detecting the display abortion request of the favorite screen 907 being the slave screen, continuously displays only the dial screen 903 and the call log screen 905 and hides the favorite screen 907 and the contact screen 909 from the screen.

FIG. 10 is a flowchart of a method for displaying the execution screen in the electronic device according to an exemplary embodiment of the present disclosure.

Referring to FIG. 10, the electronic device can connect to the second electronic device in step 1001. The second electronic device can be controlled by the electronic device, and the screen displayed by the electronic device can be displayed to the second electronic device under the control of the electronic device. The electronic device can connect to the second electronic device using the medium communication such as wired communication, wireless communication, or human body communication.

In step 1003, the electronic device can identify the running application.

In step 1005, the electronic device can identify the screens of the running application. The electronic device can identify the multiple screens of the application and their slave screens.

In step 1007, the electronic device can define the master screen and the slave screen of the running application. The electronic device can define the default screen of the running application or the last screen of the previous operation, as the master screen.

In step 1009, the electronic device can send the master screen and the slave screen to the second electronic device. The electronic device can send the screen to the second electronic device while not displaying the master screen and the slave screen or while displaying at least one of the master screen and the slave screen.

FIGS. 11A and 11B depict the screen control of the electronic device according to an exemplary embodiment of the present disclosure.

The electronic device 1101 can provide the second electronic device with the master screen and the slave screen of the running application as shown in FIG. 11A. For example, the electronic device 1101 can display only the master screen of the running application. The electronic device 1101 can identify the slave screen of the displayed master screen and provide the master screen and the slave screen to the second electronic device. For example, the electronic device 1101 can display the master screen and the slave screen of the running application, and provide the displayed master and slave screens to the second electronic device.

The second electronic device can display the master screen and the slave screens 1113 through 1119 received from the electronic device 1101.

The second electronic device can display the screens received from the electronic device 1101 by fetching a predefined display region. The second electronic device can display the master screen and the slave screens by expanding the fetched display region.

For example, the second electronic device can fetch a plurality of display regions and display the master screen and the slave screens in the respective display regions.

For example, the second electronic device 1111 can fix the size of the fetched display region and then display the master screen and the slave screens by reducing the size of the master screen or the slave screen.

The second electronic device can secure the region for fetching the display region and then display the screens received from the electronic device 1101. For example, as displaying the other screen, for example, a web screen 1123, the second electronic device can display the master screen and the slave screens 1113 and 115 in the region 1125 excluding the web screen 1123.

When the electronic device is connected to the second electronic device and a third electronic device executes the application as shown in FIG. 11B, the electronic device can provide the master screen and the slave screen of the running application to the second electronic device. For example, when receiving the incoming call 1131 from the third electronic device, the electronic device can display the incoming call screen and provide the second electronic device with the call log screen 1333, the contact screen 1335, or the caller detailed information screen being the slave screen of the incoming call screen.

While the incoming call is described in the drawing, the present disclosure is applicable to the incoming message and particular application execution of the third electronic device.

FIG. 12 depicts the screen display of the electronic device according to an exemplary embodiment of the present disclosure.

Referring to FIG. 12, the electronic device can detect the application execution. The electronic device can define and display the multiple screens of the applications executed by the input, as the master screen and the slave screen.

The electronic device 1201 can divide the master screen and the slave screen. The electronic device can separate the screens by applying different sizes and colors to the master screen and the slave screen.

For example, the electronic device can display the master screen of the first size and the slave screen of the second size smaller than the first size. The electronic device can display the slave screen in a different size according to the subordinate relationship.

As shown in FIG. 12, the electronic device can display the dial screen 1202 being the master screen in the first size, and the call log screen 1205 and the favorite screen 1207 being the slave screens in the second size and the third size which are smaller than the master screen.

FIG. 13 is a flowchart of a method for controlling the screen in the electronic device according to an exemplary embodiment of the present disclosure.

Referring to FIG. 13, the electronic device can display the master screen and the slave screen in step 1301.

The electronic device can detect a screen update event in step 1303.

The electronic device can determine whether at least one of the master screen and the slave screen is updated. For example, the electronic device can determine whether the displayed screen is changed according to the event such as incoming call or incoming message.

In step 1305, the electronic device can update the displayed master screen and slave screen according to the screen update event. For example, when receiving the call during the call application execution, the electronic device can display information indicating the incoming call in the master screen and also update the incoming call information in the call log screen being the slave screen.

FIG. 14 depicts the screen display of the electronic device according to an exemplary embodiment of the present disclosure.

Referring to FIG. 14, the electronic device can detect the application execution. The electronic device can define and display the multiple screens of the application executed by the input, as the master screen and the slave screen.

The electronic device can detect the screen update event during the screen display. For example, the screen update event can change the status of the current screen.

For example, while the master screen and the slave screen of the call application are displayed, the screen update event corresponding to the incoming call, the incoming message, the outgoing call, or the outgoing message can occur.

The electronic device can update the displayed master and slave screens. For example, when receiving the call during the call application, the electronic device can display the incoming call information in the master screen 1401, adds the incoming call record 1405 to the call log screen 1403 being the slave screen, and change with caller information 1407 in the contact screen.

FIGS. 15A and 15B depict the screen display of the electronic device according to an exemplary embodiment of the present disclosure.

Referring to FIGS. 15A and 15B, the electronic device can detect the application execution. The electronic device can define and display the multiple screens of the application executed by the input, as the master screen and the slave screen.

The electronic device can control the application by detecting the input to the displayed master and slave screens. The electronic device can control the application by detecting the movement of the displayed screen. For example, when detecting the input for overlapping the displayed call log screen 1501 and contact screen 1503 as shown in FIG. 15A, the electronic device can add the information recorded in the call log to the contacts. The electronic device can display a screen 1507 notifying that the phone number recorded in the call log is added to the contacts as shown in FIG. 15B.

For example, the electronic device can display a new screen by detecting the input. For example, when detecting a preset input for two dialog screens, the electronic device can display the single screen combining the two screens. When detecting a preset input for two web screens, the electronic device can unite and display the two browsers in multiple screens.

For example, the electronic device can control the application while displaying different screens. For example, when detecting a preset input for the dialog window and the image screen, the electronic device can process to add the selected image to the dialog window.

FIGS. 16A, 16B and 16C depict the screen display of the electronic device according to an exemplary embodiment of the present disclosure.

Referring to FIGS. 16A, 16B and 16C, the electronic device can display the master screen and the slave screen of the running application.

The electronic device can display a plurality of screens in the single display region fetched in the application execution. As shown in FIG. 16A, the single display region 1601 can display the master screen 1603 and the slave screen 1605. When lacking the display region for displaying the screens, the electronic device can expand the fetched display region and thus display the master screen and the slave screen. For example, the electronic device can secure the region for expanding the display region and then expand at least one side of the displayed screen upwards, downwards, to the left, to the right, or crosswise.

The electronic device can display the master screen and its slave screen by adding other display region. For example, as shown in FIG. 16B, the electronic device can display the master screen in a first display region 1607 displayed and the slave screen in a second display region 1609 newly added.

As shown in FIG. 16C, after fixing the size of the fetched display region, the electronic device can display the master screen 1611 in the display region of the first size and reduce the slave screen to the second size smaller than the first size.

FIG. 17 is a flowchart of a method for displaying the screen in the electronic device according to an exemplary embodiment of the present disclosure.

Referring to FIG. 17, the electronic device can fetch the display region for displaying the screens in the application execution in step 1701.

In step 1703, the electronic device can fetch and display a plurality of screens in the fetched display region.

The electronic device can define the master screen and the slave screen with the multiple screens of the application.

The fetching and displaying of the screens can include displaying the screens by expanding the display region, displaying the screens by fetching a plurality of display regions, or displaying the screens of an adjusted size in the display region.

The display method of the electronic device can include controlling at least one screen selected from the displayed screens, and controlling a slave screen of the selected screen.

The controlling of the selected screen can include display abortion, merge, and movement of the selected screen.

The display method of the electronic device can include providing the displayed screens to a second electronic device.

As set forth above, the electronic device displays the master screen and the slave screen of the call application. The electronic device can be applied to a memo application, a browser application, or a camera application. For example, for the memo application, the electronic device can define and display a new memo screen as the master screen, and define and display a memo of a predefined group and a previous memo as the slave screens.

For example, for the browser application, the electronic device can define and display a home screen as the master screen, and define and display an address screen of the favorites as the slave screen.

For example, for the camera application, the electronic device can define and display a camera view as the master screen, and define and display a gallery screen or an edit screen as the slave screen.

The aforementioned components of the electronic device each can include one or more components, and the names of the corresponding components can differ according to the type of the electronic device. The present electronic device can include at least one of the components, omit some components, or further include other components. Some of the components can be united to the single entity to carry out the same functions of the original components.

The component, for example, a module can indicate a unit including a combination of one or more of, for example, hardware, software, and firmware. The module can be interchangeably used with, for example, a unit, logic, a logical block, a component, or a circuit. The module can be a minimum unit or part of the component integrally formed. The module may be a minimum unit or part for one or more functions. The module can be implemented mechanically or electronically. For example, the module can include at least one of an Application Specific Integrated Circuit (ASIC) chip, Field Programmable Gate Arrays (FPGAs), and a programmable-logic device for particular operations, which are well known or to be invented.

At least part of the apparatus (e.g., modules or functions) or the method of the present disclosure can be implemented as, for example, instructions stored in computer-readable storage media of the programming module. When one or more processors execute the instruction, it/they can perform the function corresponding to the instruction. The computer-readable storage medium can include, for example, a memory. At least part of the programming module can be realized (e.g., executed) by, for example, the processor. At least part of the programming module can include, for example, a module, a program, a routine, sets of instructions, or a process for one or more functions.

The computer-readable recording medium includes, for example, magnetic media such as hard disk, floppy disk and magnetic tape, optical media such as Compact Disc Read Only Memory (CD-ROM) and Digital Versatile Disc (DVD), magneto-optical media such as floptical disk, and hardware devices specifically configured to store and execute the program instructions (e.g., the programming modules) such as ROM, Random Access Memory (RAM), and flash memory. The program instruction can include not only a machine code made by a complier but also a high-level language code executable by a computer using an interpreter. The hardware device can serve as one or more software modules for fulfilling the operations of the present disclosure, and vice versa.

The module or the programming module can include at least one of the components, omit some components, or further include other components. The operations to be conducted by the modules, the programming modules, or other components can be carried out in sequence, in parallel, repeatedly, or heuristically. Some operations can be executed in a different order, omitted, or added with other operations.

In the storage medium storing the instructions, the instructions, when executed by at least one processor, controls the at least one processor to fulfill at least one operation. The at least one operation can include displaying the display region for displaying the application execution screen, and fetching and displaying a plurality of screens in the display region.

The running application screen including the master screen and the slave screen can enhance the screen display function of the electronic device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method in an electronic device, the method comprising:
   displaying, in response to detecting a first input for executing an application, a master window on the application within a region of a screen of the electronic device and a slave window on the application configured to be switchable from the master window within another region of the screen;
   changing, in response to detecting an event on the application, at least one of the master window or the slave window, wherein the master window provides an icon respectively indicating a plurality of functions of the application and a view for a function; and
   switching, in response to detecting a second input on another icon of the slave window, the master window with the slave window so that the master window becomes another slave window and the slave window becomes the master window,
   wherein the view for the function, in response to the detecting of the second input switches to another view for another function of the plurality of functions.

2. The method of claim 1, wherein the displaying further comprises:
   displaying the master window at a location of the screen corresponding to a first priority; and
   displaying the slave window at another location of the screen corresponding to a second priority.

3. The method of claim 1, further comprising:
   displaying, on the master window and the slave window, a menu for ceasing the displaying the master window or the slave window; and
   in response to detecting an input on the menu, ceasing a window corresponding to the detected input on the menu.

4. The method of claim 1, further comprising:
   displaying the switched master window as the another slave window and the switched slave window as the master window.

5. The method of claim 1,
   wherein a size of the master window is distinct with a size of the slave window, and
   wherein the size of the master window and the size of the slave window is adjusted by a user input.

6. The method of claim 1, further comprising providing, to another electronic device, a plurality of screens comprising the at least one of the master window or the slave window.

7. An electronic device comprising:
   a display; and
   at least one processor, operatively coupled to the display, configured to:
      display, in response to detecting a first input for executing an application, a master window on the application within a region of a screen of the electronic device and a slave window on the application configured to be switchable from the master window within another region of the screen,
      change, change, in response to the detecting an event on the application, at least one of the master window or the slave window, wherein the master window provides an icon respectively indicating a plurality of functions of the application and a view for a function; and
      switch, in response to detecting a second input on another icon of the slave window, the master window with the slave window so that the master window becomes another slave window and the slave window becomes the master window,
wherein the view for the function, in response to the detecting of the second input, switches to another view for another function of the plurality of functions.

8. The electronic device of claim 7, wherein the at least one processor is further configured to:
display the master window at a location of the screen corresponding to a first priority and displaying the slave window at another location of the screen corresponding to a second priority.

9. The electronic device of claim 7, wherein the at least one processor is further configured to:
display on the master window and the slave window, a menu for ceasing the displaying the master window or the slave window, and
in response to detecting an input on the menu, ceasing a window corresponding to the detected input on the menu.

10. The electronic device of claim 7, wherein the at least one processor is further configured to control to:
display, on the display, the switched master window as the another slave window and the switched slave window as the master window.

11. The electronic device of claim 7, wherein a size of the master window is distinct with a size of the slave window.

12. The electronic device of claim 7,
wherein a size of the master window is adjusted by a user input, and
wherein a size of the slave window is adjusted by a user input.

13. The electronic device of claim 7, wherein the at least one processor is further configured to:
display a plurality of windows of display regions for displaying the master window and the slave window.

14. The electronic device of claim 7, wherein the at least one processor is further configured to:
fetch, in response to the detecting the first input, a display region; and
display the master window and the slave window on the display region.

15. The electronic device of claim 7, wherein the master window is predetermined by detecting a user input for selecting the master window or a last executed window based on the application used previously.

16. An apparatus comprising:
a touch screen display;
a communication circuitry;
a memory configured to store an application; and
at least one processor configured to:
establish a communication connection with an external electronic device using the communication circuitry,
generate display information representing a master window and a slave window based at least in part on the establishing of the communication connection, the master window including a first screen corresponding to the application and the slave window including a second screen corresponding to the application, and the slave window is switchable from the master window,
transmit the display information to the external electronic device via the communication connection such that at least one portion of the first screen and at least one portion of the second screen are to be displayed concurrently and as part of the master window and the slave window, respectively, via a display operatively coupled with the external electronic device, and that the master window and the slave window are to be controlled independently from each other, wherein the first screen provides an icon respectively indicating a plurality of functions of the application and a view for a function; and
switch, in response to detecting an input on another icon of the slave window, the master window with the slave window so that the master window becomes another slave window and the slave window becomes the master window,
wherein the view, in response to the detecting of the input, switches to another view for another function of the plurality of functions.

17. The apparatus of claim 16, wherein the at least one processor is further configured to:
refrain from displaying the first screen and the second screen via the touch screen display while the first screen and the second screen are displayed via the display.

18. The apparatus of claim 16, wherein the at least one processor is further configured to:
adjust a size of the first screen or the second screen based at least in part on the size of the display.

19. The apparatus of claim 16, wherein the at least one processor is further configured to:
assign, as at least part of the generating, a first identifier to the master window and a second identifier to the slave window such that a plurality of windows comprising the master window and the slave window are controlled independently from each other via the application using the first identifier or the second identifier.

20. The apparatus of claim 16, wherein the at least one processor is further configured to:
display a third screen corresponding to the application via the touch screen display prior to the establishing; and
transmit another display information representing a second slave window and the third screen to the external electronic device via the communication connection such that at least one portion of the third screen is to be displayed as part of the second slave window via the display.

21. The apparatus of claim 16, wherein the at least one processor is further configured to:
generate the display information such that at least one portion of the first screen is overlapped with at least one portion of the second screen.

22. An apparatus comprising:
a touch screen display;
a communication circuitry;
a memory configured to store a specified application; and
at least one processor configured to:
establish a communication connection with an external electronic device using the communication circuitry,
generate display information representing a master window and a slave window, wherein the master window includes a first screen and a second screen corresponding to the specified application based at least in part on the establishing of the communication connection, and the slave window is switchable from the master window,
transmit the display information to the external electronic device via the communication connection such that at least one portion of the first screen and at least one portion of the second screen are to be displayed concurrently via a display operatively coupled with the external electronic device, and to be controlled independently from each other, wherein the first screen provides an icon of a plurality of icons respectively indicating a plurality of functions of the specified application and a view for a function; and switch, in response to detecting an input on another icon of the plurality of icons, the master window with the slave window so that the master window becomes another slave window and the slave window becomes the master window, wherein the view, in response to the detecting of the input switches to another view for another function.

23. The apparatus of claim 22, wherein the at least one processor is further configured to:

generate the first screen as part of the master window, and the second screen as part of the slave window separate from the master window, the display information including first display information corresponding to the master window and second display information corresponding to the slave window.

24. The apparatus of claim 23, wherein the at least one processor is further configured to:

assign a first identifier to the master window and a second identifier to the slave window such that the at least one portion of the first screen is to be displayed as part of the master window and the at least one portion of the second screen is to be displayed as part of the slave window, and that the master window and the slave window are to be controlled independently from each other via the specified application using the first identifier or the second identifier.

25. The apparatus of claim 22, wherein the at least one processor is further configured to:

control the first screen or the second screen displayed via the display in response to a touch input, a pen input, or a voice input obtained via the apparatus.

26. The apparatus of claim 25, wherein the at least one processor is further configured to:

update at least one portion of the display information as at least part of the controlling.

\* \* \* \* \*